United States Patent
Noh et al.

(10) Patent No.: US 11,211,961 B2
(45) Date of Patent: Dec. 28, 2021

(54) FOLDABLE ELECTRONIC DEVICE INCLUDING ANTENNA

(71) Applicant: Samsung Electronics Co., Ltd., Suwon-si (KR)

(72) Inventors: Juseok Noh, Suwon-si (KR); Hongil Kwon, Suwon-si (KR); Yeonwoo Kim, Suwon-si (KR); Seongmin Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/018,022

(22) Filed: Sep. 11, 2020

(65) Prior Publication Data

US 2021/0075459 A1    Mar. 11, 2021

(30) Foreign Application Priority Data

Sep. 11, 2019   (KR) .................. 10-2019-0113092

(51) Int. Cl.
*H04B 1/3827* (2015.01)
*H01Q 1/52* (2006.01)
(Continued)

(52) U.S. Cl.
CPC ........... *H04B 1/3833* (2013.01); *G06F 3/041* (2013.01); *H01Q 1/243* (2013.01); *H01Q 1/521* (2013.01);
(Continued)

(58) Field of Classification Search
CPC ...... H04B 1/3833; G06F 3/041; H01Q 1/243; H01Q 1/521; H04M 1/0245; H04M 1/0268; H04M 2250/12
See application file for complete search history.

(56) References Cited

U.S. PATENT DOCUMENTS

2008/0069038 A1* 3/2008 Yamamoto ........... H04B 17/382
370/328
2009/0181732 A1    7/2009 Isoda et al.
(Continued)

FOREIGN PATENT DOCUMENTS

JP    2006165805 A    6/2006
JP    2011029958 A    2/2011
(Continued)

OTHER PUBLICATIONS

International Search Report and written opinion dated Dec. 8, 2020, issued in International Application No. PCT/KR2020/012336.

*Primary Examiner* — Nguyen T Vo
(74) *Attorney, Agent, or Firm* — Jefferson IP Law, LLP

(57) ABSTRACT

An electronic device including an antenna is provided. The electronic device includes a housing including a first housing structure having a first side member, a second housing structure having a second side member, and a hinge structure connecting the first housing structure and the second housing structure to each other, and a transceiver electrically connected with the first side member and the second side member. The first side member includes a first conductive member, a second conducive member spaced apart from the first conductive member, and a first nonconductive member disposed between the first conductive member and the second conductive member, as a first antenna group, and a third conductive member disposed at an edge adjacent to the hinge structure of edges of the first side member to correspond to the first conductive member, a fourth conductive member facing the second conductive member and spaced apart from the third conductive member, and a second nonconductive member disposed between the third conductive member and the fourth conductive member as a second antenna group.

20 Claims, 15 Drawing Sheets

(51) Int. Cl.
*G06F 3/041* (2006.01)
*H01Q 1/24* (2006.01)
*H04M 1/02* (2006.01)

(52) U.S. Cl.
CPC ....... *H04M 1/0245* (2013.01); *H04M 1/0268* (2013.01); *H04M 2250/12* (2013.01)

(56) References Cited

U.S. PATENT DOCUMENTS

| | | | |
|---|---|---|---|
| 2009/0233657 A1* | 9/2009 | Ogawa | H01Q 9/16 455/575.3 |
| 2011/0169712 A1* | 7/2011 | Sumi | H01Q 5/50 343/893 |
| 2014/0266926 A1 | 9/2014 | Merz et al. | |
| 2019/0067811 A1 | 2/2019 | So | |
| 2019/0356172 A1* | 11/2019 | Hajimiri | H02J 50/80 |

FOREIGN PATENT DOCUMENTS

| | | |
|---|---|---|
| KR | 20050122778 A | 12/2005 |
| KR | 20190102743 A | 9/2019 |
| WO | 2012169187 A1 | 12/2012 |
| WO | 2019/062891 A1 | 4/2019 |

\* cited by examiner

FOLDABLE ELECTRONIC DEVICE INCLUDING ANTENNA

CROSS-REFERENCE TO RELATED APPLICATION(S)

This application is based on and claims priority under 35 U.S.C. § 119 of a Korean patent application number 10-2019-0113092, filed on Sep. 11, 2019, in the Korean Intellectual Property Office, the disclosure of which is incorporated by reference herein in its entirety.

BACKGROUND

1. Field

The disclosure relates to a foldable electronic device including an antenna.

2. Description of Related Art

Common foldable electronic devices may include a hinge structure. Foldable electronic devices can be folded and unfolded about the hinge structure.

Foldable electronic devices may include an antenna to perform wireless communication. At least a portion of the housing of foldable electronic devices may be made of a conductive material and the at least a portion of the housing made of a conductive material can operate as an antenna radiator of the foldable electronic devices.

The above information is presented as background information only to assist with an understanding of the disclosure. No determination has been made, and no assertion is made, as to whether any of the above might be applicable as prior art with regard to the disclosure.

SUMMARY

When a portion of the housing of a foldable electronic device is used as antenna radiators, the antenna radiators may come close to each other when the foldable electronic device is folded. Wireless signals that are transmitted outside may be distorted or the radiation performance may be deteriorated by mutual interference of the adjacent antenna radiators. For example, the resonance frequency of a wireless signal may be changed or the radiation pattern may be changed.

Aspects of the disclosure are to address at least the above-mentioned problems and/or disadvantages and to provide at least the advantages described below. Accordingly, an aspect of the disclosure is to provide an electronic device having antenna performance improved regardless of folding of a foldable electronic device.

Additional aspects will be set forth in part in the description which follows and, in part, will be apparent from the description, or may be learned by practice of the presented embodiments.

In accordance with an aspect of the disclosure, an electronic device is provided. The electronic device includes a housing configured to form a rear surface and a side of the electronic device in case the electronic device is in an unfolded state, the housing including a first housing structure having a first side member configured to form at least a first partial area of the side, a second housing structure having a second side member configured to form at least a second partial area of the side, and a hinge structure configured to connect the first housing structure and the second housing structure to each other, the housing configured to be changed into a folded state or an unfolded state about the hinge structure, a flexible display disposed in a space defined by the housing, the flexible display configured to form a front surface of the electronic device in case the electronic device is in the unfolded state, and include a first section corresponding to the first housing structure and a second section corresponding to the second housing structure, in which the first section and the second section face each other in case the electronic device is in the folded state, and a transceiver electrically connected with the first side member and the second side member to receive a wireless communication signal, in which the first side member includes a first antenna group including a first conductive member disposed on an edge distant from the hinge structure, edges of the first side member and a second conductive member being spaced apart from the first conductive member, and a second antenna group including a third conductive member disposed at an edge adjacent to the hinge structure of the edges of the first side member to be opposite to the first conductive member and a fourth conductive member spaced apart from the third conductive member to be opposite to the second conductive member, and the second side member includes a third antenna group including a fifth conductive member disposed at an edge distant from the hinge structure, edges of the second side member and a sixth conductive member being spaced apart from the fifth conductive member.

In accordance with another aspect of the disclosure, an electronic device is provided. The electronic device includes a housing configured to form a rear surface and a side of the electronic device in case the electronic device is in an unfolded state, the housing including a first housing structure having a first side member configured to form at least a first partial area of the side, a second housing structure having a second side member configured to form at least a second partial area the side, and a hinge structure configured to connect the first housing structure and the second housing structure to each other, the housing configured to be changed into a folded state or an unfolded state about the hinge structure, a flexible display disposed in a space defined by the housing, the flexible display configured to form a front surface of the electronic device in case the electronic device is in the unfolded state, and include a first section corresponding to the first housing structure and a second section corresponding to the second housing structure, in which the first section and the second section face each other in case the electronic device is in the folded state, and a transceiver electrically connected with the first side member, the second side member, and the hinge structure to receive a wireless communication signal, in which the first side member includes a first antenna group including a first conductive member disposed an edge distant from the hinge structure, edges of the first side member and a second conductive member being spaced apart from the first conductive member, the second side member may include a second antenna group including a third conductive member disposed at an edge distant from the hinge structure, edges of the second side member and a fourth conductive member being spaced apart from the third conductive member, and the hinge structure includes a third antenna group a fifth conductive member configured to form a first part of the hinge structure and a sixth conductive member spaced apart from the fifth conductive member and configured to form a second part of the hinge structure.

According to various embodiments, it is possible to maintain antenna performance regardless of the state of a foldable electronic device, in detail, whether the foldable electronic device is in a folded state or an unfolded state.

It is possible to secure improved antenna performance even in various environments by switching an antenna, based on the state of a foldable electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
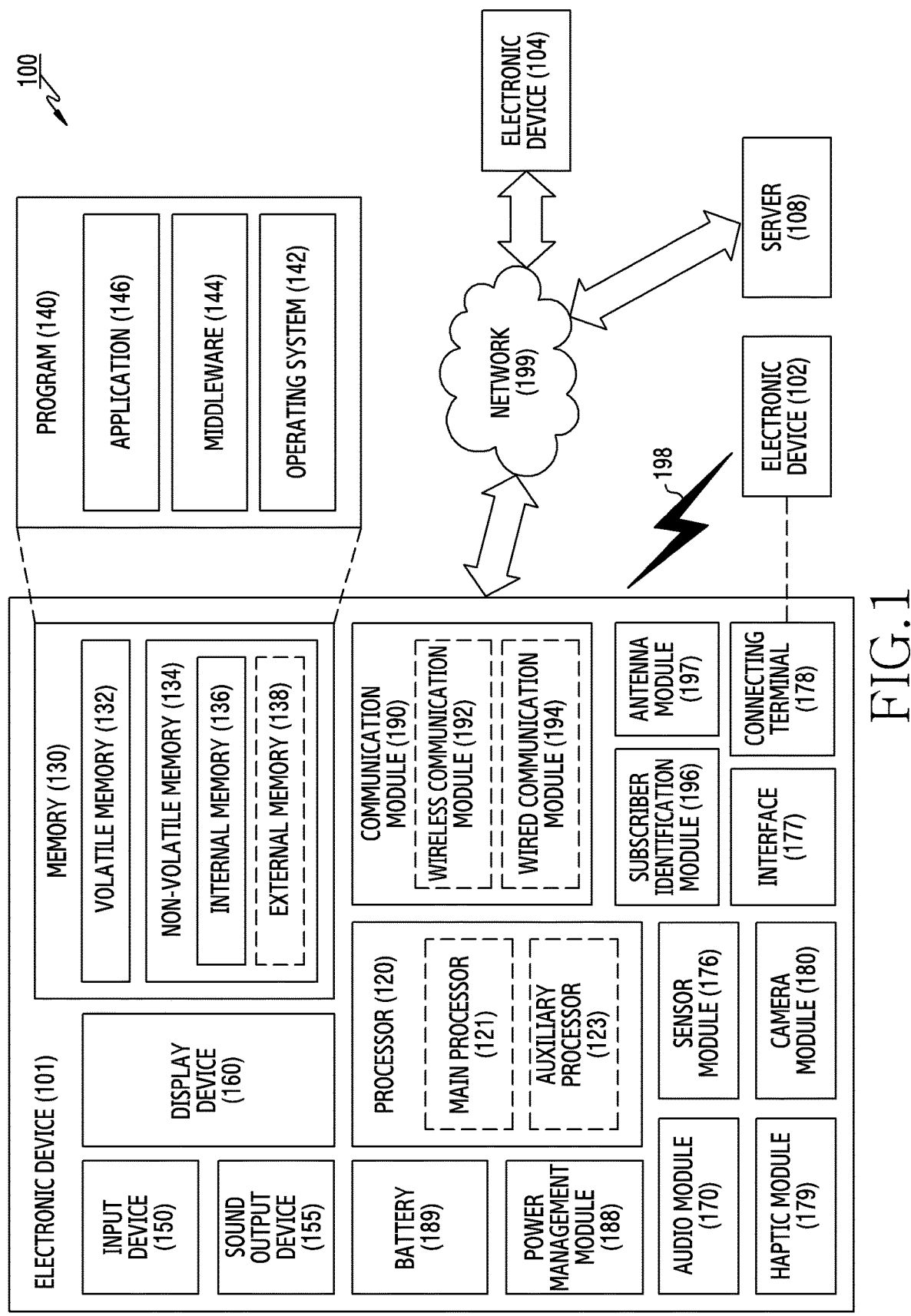
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120 (e.g., at least one processor), memory 130, an input device 150, a sound output device 155, a display device 160, an audio module 170, a sensor module 176, an interface 177, a haptic module 179, a camera module 180, a power management module 188, a battery 189, a communication module 190 (e.g., a transceiver), a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
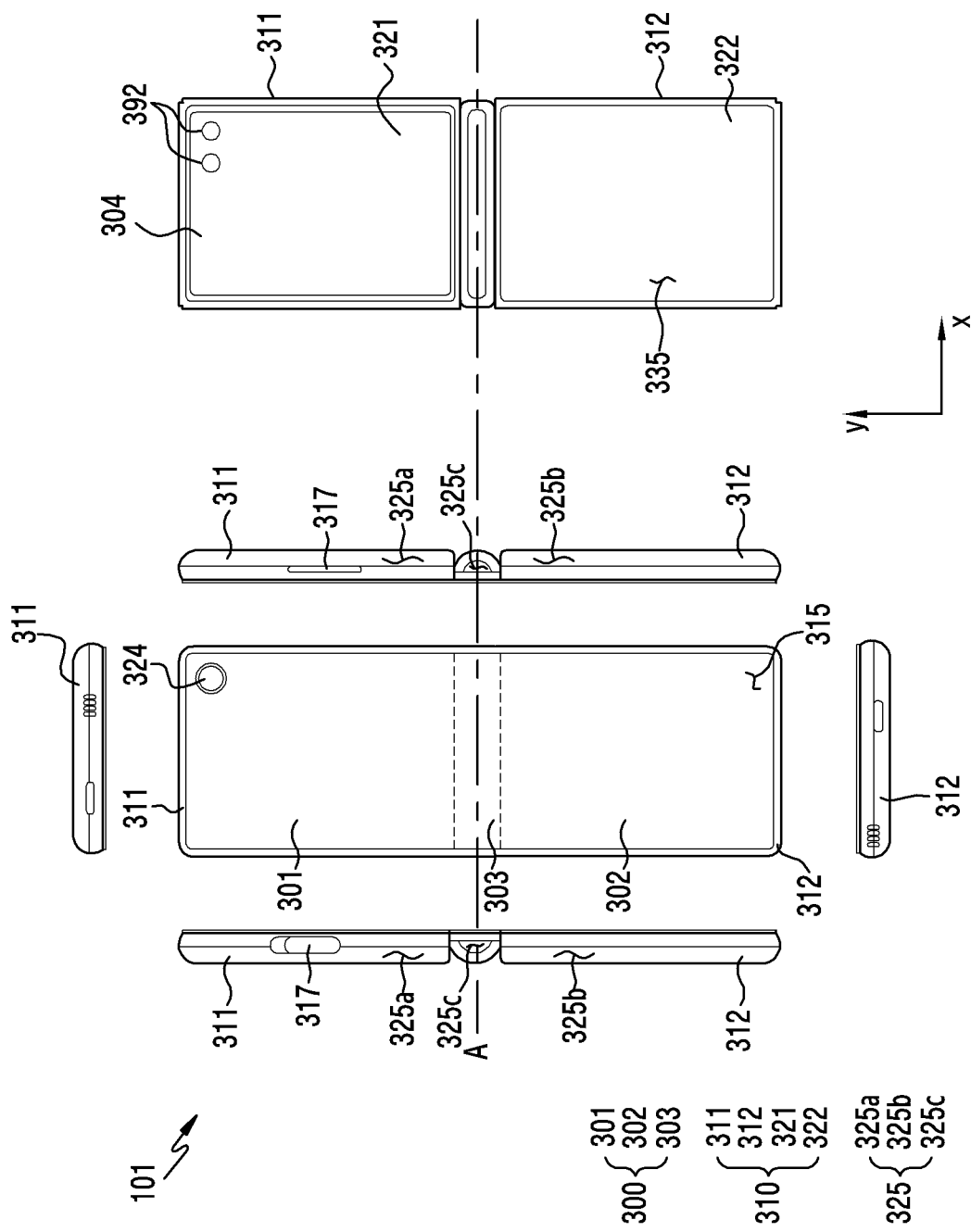
FIG. 2A is a view showing an unfolded state of an electronic device according to an embodiment of the disclosure.
Figure 2B:
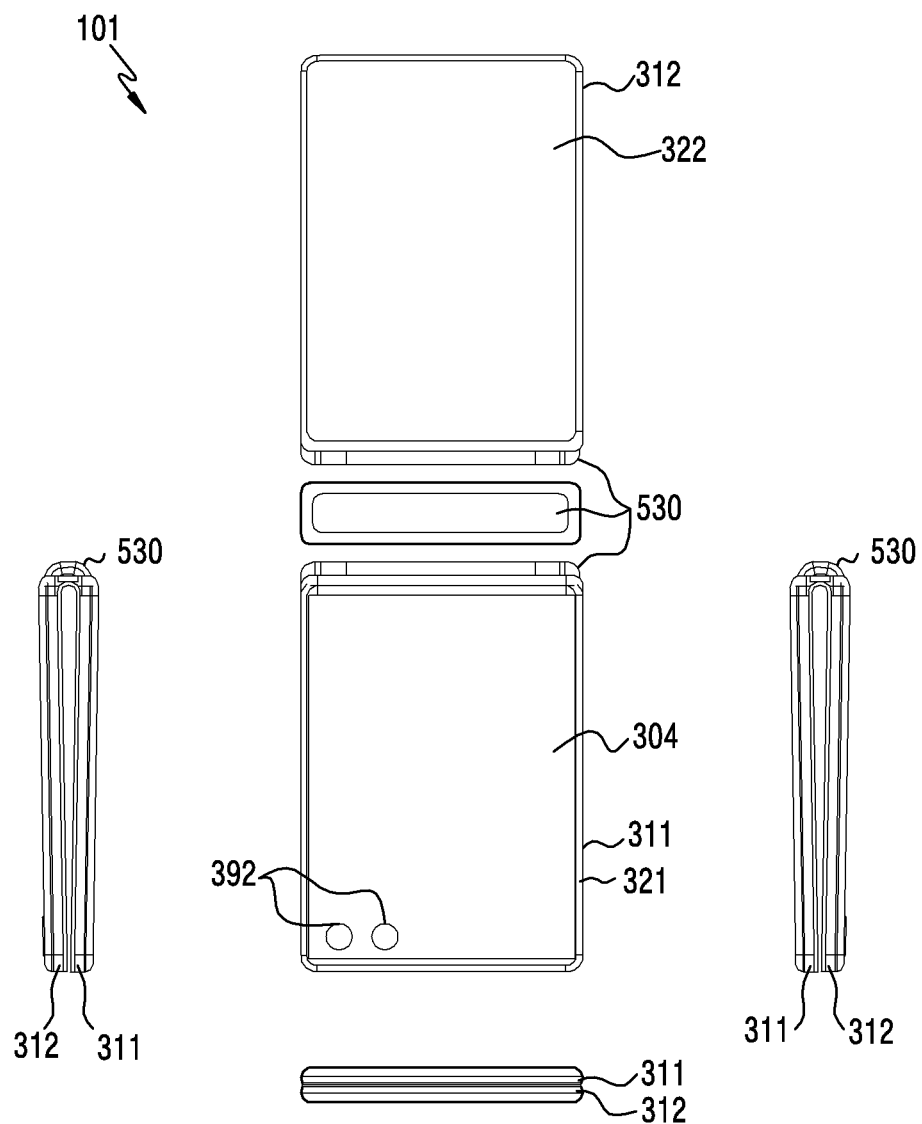
FIG. 2B is a view showing a folded state of the electronic device according to an embodiment of the disclosure.

FIG. 2A is a view showing an unfolded state of an electronic device according to an embodiment of the disclosure, and FIG. 2B is a view showing a folded state of the electronic device according to an embodiment of the disclosure.

Referring to FIGS. 2A and 2B, in an embodiment, an electronic device 101 may include: a foldable housing 310; a hinge cover 330 covering a foldable portion of the foldable housing 310; and a flexible or foldable display 300 (a "display 300" in abbreviation) disposed in a space defined by the foldable housing 310. In this specification, the surface on which the display 300 is disposed is defined as a first surface, or the front surface 315 of the electronic device 101. The opposite surface to the front surface is defined as a second surface, of a rear surface 355 of the electronic device 101. The surface surrounding the space between the front surface 315 and the rear surface 355 is defined as a third surface, or a side 325 of the electronic device 101. The side 325 may include a side 325a of a first housing structure 311, a side 325b of a second housing structure 312, and a side 325c of a hinge cover 530. The side of the hinge cover 530 may be a side of a hinge structure (e.g., 540 in FIG. 3), depending on various embodiments. In an embodiment, the hinge cover 530 may be integrally formed with the hinge structure (540 in FIG. 3).

In an embodiment, the foldable housing 310 may include a first housing structure 311 having a sensor section 324, a second housing structure 312, a first rear cover 321, and a second rear cover 322. The foldable housing 310 of the electronic device 101 is not limited to the type and combination shown in FIGS. 1, 2A, and 2B, and may be implemented by compounding and/or combining other shapes or parts. For example, in another embodiment, the first housing structure 311 and the first rear cover 321 may be integrally formed, and the second housing structure 312 and the second rear cover 322 may be integrally formed.

Referring to FIG. 2A, the first housing structure 311 and the second housing structure 312 are disposed at both sides with a folding axis (axis A) therebetween, and their entire shape may be symmetric with respect to the folding axis. As described below, the first housing structure 311 and the second housing structure 312 may be changed in angle or distance therebetween in accordance with whether the state of the electronic device 101 is an unfolded state, a folded state, or an intermediate state. According to an embodiment, as shown in FIG. 1, the first housing structure 311 and the second housing structure 312 may form a recess together for accommodating the display 300.

In an embodiment, at least a portion of the first housing structure 311 and the second housing structure 312 may be made of a metallic material or a nonmetallic material that has rigidity of selected intensity to support the display 300.

In an embodiment, the sensor section 324 may be defined in a predetermined area adjacent to a corner of the first housing structure 311. However, the disposition, shape, and size of the sensor section 324 are not limited to the example shown in the figures. For example, in another embodiment, the sensor section 324 may be provided at another corner of the first housing structure 311 or in a predetermined area between an upper corner and a lower corner. In an embodiment, components disposed inside the electronic device 101 to perform various functions may be exposed on the front surface 315 of the electronic device 101 through the sensor section 324 or one or more openings provided in the sensor section 324. In various embodiments, the components may include various kinds of sensors. The sensors, for example, may include at least one of a front camera, a receiver, or a proximity sensor.

The first rear cover 321 may be disposed at a side of the folding axis A on the rear surface 335 of the electronic device 101. The first rear cover 321, for example, may have a rectangular periphery and the periphery may be surrounded by the first housing structure 311. Similarly, the second rear cover 322 is disposed at the other side of the folding axis on the rear surface 335 of the electronic device 101 and the periphery thereof may be surrounded by the second housing structure 312.

In the embodiment shown in the figures, the first rear cover 321 and the second rear cover 322 may have a substantially symmetric shape with the folding axis (axis A) therebetween. However, the first rear cover 321 and the second rear cover 322 do not necessarily have a symmetric shape, and in another embodiment, the electronic device 101 may include a first rear cover 321 and a second rear cover 322 that have various shapes. In another embodiment, the first rear cover 321 may be integrally formed with the first housing structure 311 and the second rear cover 322 may be may be integrally formed with the second housing structure 312.

In an embodiment, the first rear cover 321, the second rear cover 322, the first housing structure 311, and the second housing structure 312 may define a space in which various components (e.g., a printed circuit board or a battery) of the electronic device 101 can be disposed. In an embodiment, one or more components may be disposed or visually exposed on the rear surface of the electronic device 101. For example, a sub-display 304 may be visually exposed through a predetermined area of the first rear cover 321. One or more parts or sensors may be visually exposed through an area 392 of the sub-display 304. In various embodiments, the sensors may include a proximity sensor and/or a rear camera.

Referring to FIG. 2B, the hinge cover 530 is disposed between the first housing structure 311 and the second housing structure 312 and may be configured to cover internal components (e.g., a hinge structure). In an embodiment, the hinge cover 530 may be covered by a portion of the first housing structure 311 and the second housing structure 312 or may be exposed to the outside, depending on the states (e.g., the unfolded state or the folded state) of the electronic device 101.

In an embodiment, as shown in FIG. 2A, when the electronic device 101 is in the unfolded state, at least a portion of the hinge cover 530 can be covered without being exposed by the first housing structure 311 and the second housing structure 312.

In an embodiment, as shown in FIG. 2B, when the electronic device 101 is in the folded state (e.g., a fully folded state), the hinge cover 530 can be exposed to the outside between the first housing structure 311 and the second housing structure 312.

In an embodiment, in an intermediate state in which first housing structure 311 and the second housing structure 312 are folded with a certain angle therebetween, the hinge cover 530 can be partially exposed to the outside between the first housing structure 311 and the second housing structure 312. However, in this case, the exposed area may be smaller than that in the fully folded state. In an embodiment, the hinge cover 530 may have a curved surface.

The display 300 may be disposed in a space defined by the foldable housing 310. For example, the display 300 may be seated in the recess formed by the foldable housing 310 and may configure most of the front surface 315 of the electronic device 101.

Accordingly, the front surface of the electronic device 101 may include the display 300, and a partial area of the first housing structure 311 and a partial area of the second housing structure 312 that are adjacent to the display 300. The rear surface 335 of the electronic device 101 may include the first rear cover 321, a partial area of the first housing structure 311 that is adjacent to the first rear cover 321, the second rear cover 322, and a partial area of the second housing structure 312 that is adjacent to the second rear cover 322.

The display 300 may be a display of which at least a partial area can be deformed into a flat surface or a curved surface. In an embodiment, the display 300 may have a folding section 303, a first section 301 disposed at a side from the folding section 303 (in the area over the folding section 303 shown in FIG. 2A), and a second section 302 disposed at the other side (in the area under the folding section 303 shown in FIG. 2A).

The divided sections of the display 300 shown in FIG. 2A are examples and the display 300 may be divided into a plurality of sections (e.g., four or more or two sections), depending on the structure or the function. For example, the section of the display 300 can be divided by the folding section 303 or the folding axis (axis A) extending in parallel with the x-axis in the embodiment shown in FIG. 2A, but in another embodiment, the display 300 may be divided into sections by another folding section (e.g., a folding section parallel with the y-axis) or another folding axis (e.g., a folding axis parallel with the y-axis).

The first section 301 and the second section 302 may have an entirely symmetric shape with the folding section 303 therebetween. However, the first section 301, unlike the second section 302, may have an opening, depending on existence of the sensor section 324, but may have a shape symmetric to the second section 302 in the other area. For example, the first section 301 and the second section 302 may have a portion having a symmetric shape and a portion having an asymmetric shape.

Hereafter, the operation of the first housing structure 311 and the second housing structure 312 and the sections of the display 300 according to the states of the electronic device 101 (e.g., the unfolded state and the folded state), are described.

In an embodiment, when the electronic device 101 is in the unfolded (e.g., FIG. 2A), the first housing structure 311 and the second housing structure 312 may be arranged to face the same direction while making an angle of 180 degrees. The surface of the first section 301 and the surface of the second section 302 of the display 300 may be arranged to face the same direction (e.g., toward the front surface of the electronic device) while making an angle of 180 degrees. The folding section 303 may form the same plane as the first section 301 and the second section 302.

In an embodiment, when the electronic device 101 is in the folded state (e.g., FIG. 2B), the first housing structure 311 and the second housing structure 312 may be arranged to face each other. The surface of the first section 301 and the surface of the second section 302 of the display 300 may face each other while making a small angle (e.g., between 0 to 10 degrees). The folding section 303 may be at least partially a curved surface having a predetermined curvature.

In an embodiment, when the electronic device 101 is in the intermediate state, the first housing structure 311 and the second housing structure 312 may be arranged with a certain angle therebetween. The surface of the first section 301 and the surface of the second section 302 of the display 300 may make an angle that is larger than that in the folded state and smaller than that in the unfolded state. The folding section 303 may be at least partially a curved surface having a predetermined curvature, in which the curvature may be smaller than that in the folded state.

Figure 3:
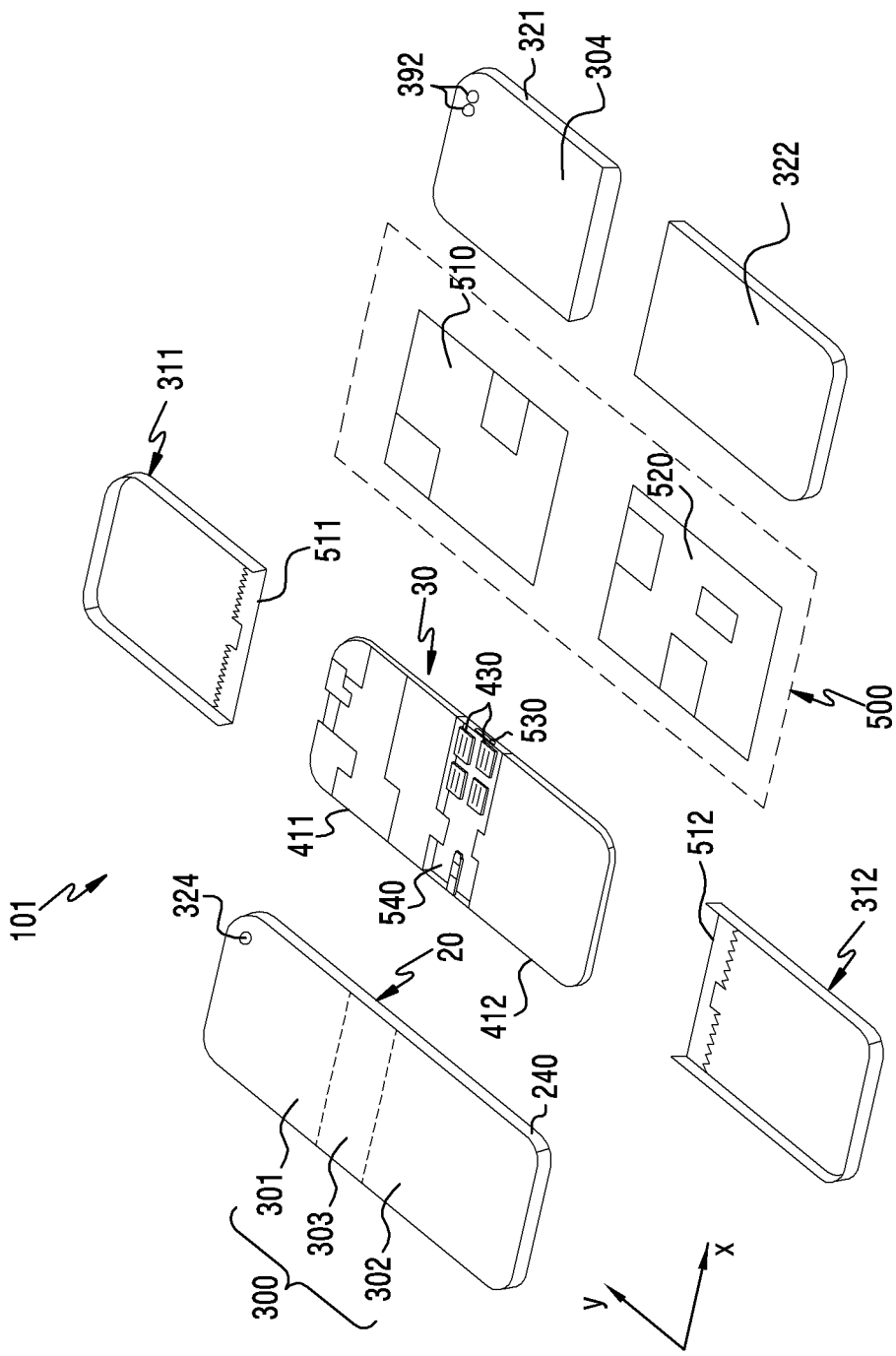
FIG. 3 is an exploded perspective view of an electronic device according to an embodiment of the disclosure.

FIG. 3 is an exploded perspective view of an electronic device according to an embodiment of the disclosure.

Referring to FIG. 3, in an embodiment, the electronic device 101 may include a display unit 20, a bracket assembly 30, a board assembly 500, a first housing structure 311, a second housing structure 312, a first rear cover 321, and a second rear cover 322. In this specification, the display unit 20 may be referred as a display module or a display assembly.

The display unit 20 may include a display 300, and one or more plate or layer 240 on which the display 300 is seated. In an embodiment, the plate 240 may be disposed between the display 300 and the bracket assembly 30. The display 300 may be disposed in at least a portion of a surface (e.g., the top surface in FIG. 2A) of the plate 240. The plate 240 may have a shape corresponding to the display 300. For example, a partial area of the plate 240 may have a shape corresponding to a sensor section 324 of the display 300.

The bracket assembly 30 may include a first bracket 411, a second bracket 412, a hinge structure 540 disposed between the first bracket 411 and the second bracket 412, a hinge cover 530 covering the hinge structure 540 when seen from the outside, and a wiring member 430 (e.g., a Flexible Printed Circuit (FPC) disposed across the first bracket 411 and the second bracket 412.

In an embodiment, the bracket assembly 30 may be disposed between the plate 240 and the board assembly 500. For example, the first bracket 411 may be disposed between the first section 301 of the display 300 and a first board 510. The second bracket 412 may be disposed between the second section 302 of the display 300 and a second board 520.

In an embodiment, the wiring member 430 and the hinge structure 540 may be at least partially disposed in the bracket assembly 30. The wiring member 430 may be disposed across the first bracket 411 and the second bracket 412 (e.g., in the y-axial direction). The wiring member 430 may be disposed perpendicular to a folding axis of the folding section 303 (e.g., the x-axis or the folding axis A in FIG. 2A) of the electronic device 101.

The board assembly 500, as described above, may include a first board 510 disposed at the first bracket 411 and a second board 520 disposed at the second bracket 412. The first board 510 and the second board 520 may be disposed in a space defined by the bracket assembly 30, the first housing structure 311, the second housing structure 312, the first rear cover 321, and the second rear cover 322. Components for implementing various functions of the electronic device 101 may be mounted on the first board 510 and the second board 520.

The first housing structure 311 and the second housing structure 312 may be assembled to be coupled to both sides of the bracket assembly 30 with the display 300 coupled to the bracket assembly 30. As will be described below, the first housing structure 311 and the second housing structure 312 may be combined with the bracket assembly 30 by sliding at both sides of the bracket assembly 30.

In an embodiment, the first housing structure 311 may have a first rotation support surface 511 and the second housing structure 312 may have a second rotation support surface 512 corresponding to the first rotation support surface 511. The first rotation support surface 511 and the second rotation support surface 512 may have a curved surface corresponding to a curved surface of the hinge cover 530.

In an embodiment, when the electronic device 101 is in the unfolded state (the electronic device in FIG. 2A), the first rotation support surface 511 and the second rotation support surface 512 cover the hinge cover 530, so the hinge cover 530 may not be exposed or may be minimally exposed on the rear surface 335 of the electronic device 101. On the other hand, when the electronic device 101 is in the folded state (the electronic device in FIG. 2B), the first rotary support surface 511 and the second rotary support surface 512 are rotated along the curved surface of the hinge cover 530, so the hinge cover 530 may be maximally exposed on the rear surface 335 of the electronic device 101.

Although only the hinge structure 540 will be stated without the hinge structure and the hinge cover discriminated, this is for the convenience of description and the description of the hinge structure 540 may be applied to the hinge cover 530.

Figure 4:
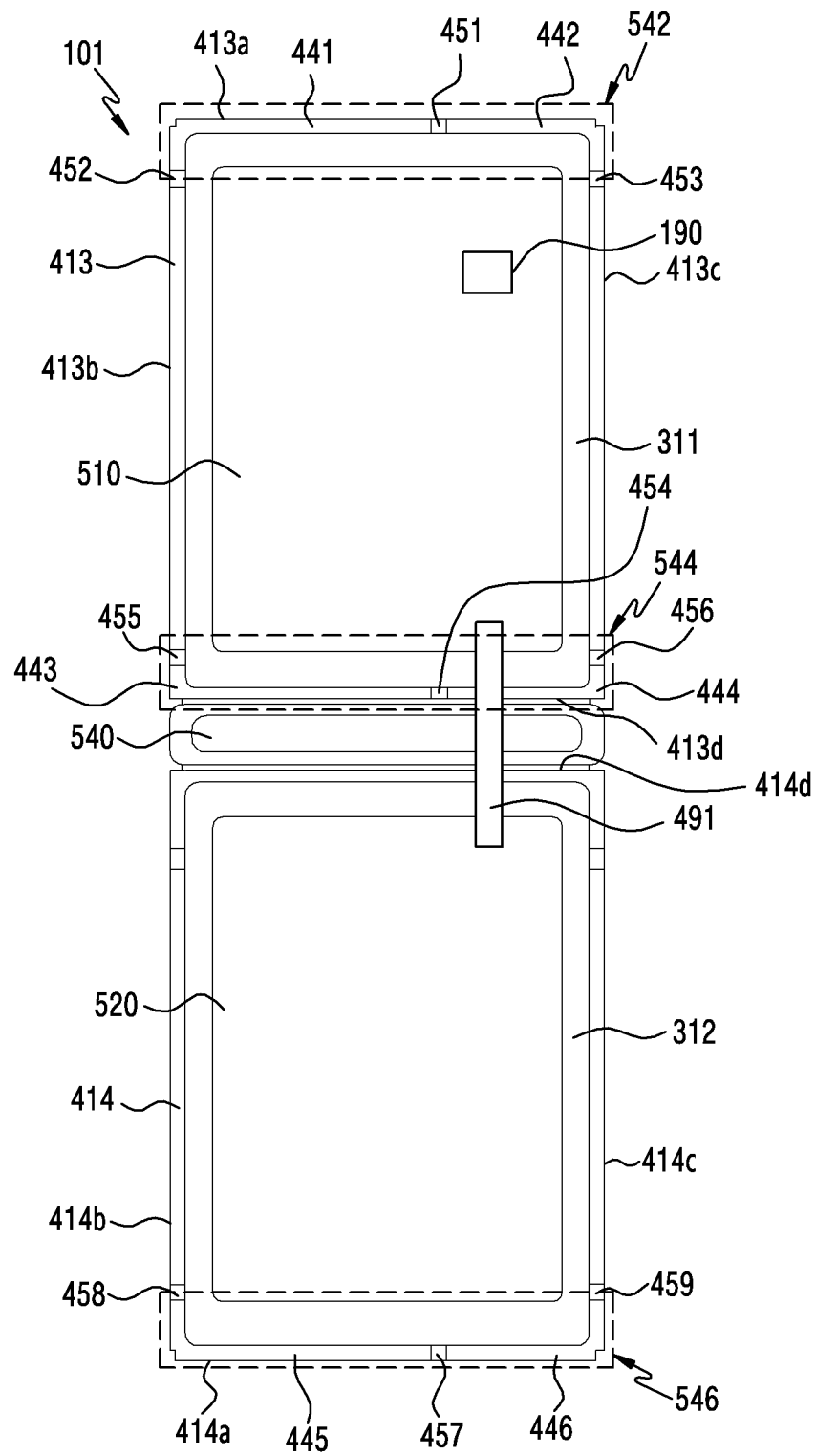
FIG. 4 is a diagram showing an unfolded state of an electronic device according to an embodiment of the disclosure.

FIG. 4 is a diagram showing an unfolded state of an electronic device according to an embodiment of the disclosure.

For the convenience of description, the display 300 of the electronic device 101 is not shown in FIG. 4. The display 300 of the electronic device 101 may be disposed to cover the components (board, etc.) shown in FIG. 4 so that the components are not exposed to the outside.

Referring to FIG. 4, the electronic device 101 may include a first board 510, a second board 520, a wiring member 491, a first side member 413, a second side member 414, and a hinge structure 540.

According to an embodiment, the first board 510 may be disposed in a spaced defined by the first housing structure 311. At least one communication module 190 may be disposed on the first board 510. The communication module 190 may be electrically connected with the first board 510 and the first board 510 may be electrically connected with the first side member 413. The communication module 190 may be electrically connected with the first side member 413 through the first board 510. The first board 510 may be electrically connected with the wiring member 491 disposed across the hinge structure 540. In an embodiment, the first board 510 may have at least one power supplier and at least one ground. The communication module 190 may include a wireless communication circuit.

According to an embodiment, the second board 520 may be disposed in a spaced defined by the second housing structure 312. The second board 520 may be electrically connected to the second side member 414. The second board 520 may be connected with the wiring member 491. The second board 520 may be electrically connected with the first board 510 through the wiring member 491. The communication module 190 may be electrically connected with the second side member 414 through the first board 510, the wiring member 491, and the second substrate 520. In an embodiment, the second board 520 may have at least one power supplier and at least one ground.

According to an embodiment, the wiring member 491 may be disposed over the first housing structure 311 and the second housing structure 312 across the hinge structure 540 of the electronic device 101. According to an embodiment, the wiring member 491 may be disposed close to any one end of the hinge structure 540. For example, the wiring member 491 may be disposed closer to the left end or the right end of the hinge structure 540 than the center of the hinge structure 540. In an embodiment, the wiring member 491 may be made of a flexible material. For example, the wiring member 491 may include a Flexible Printed Circuit (FPC). In an embodiment, the wiring member 491 can connect the first board 510 and the second board 520 to each other. The electronic device 101 can transmit and receive signals and/or power between the first board 510 and the second board 520 through the wiring member 491.

Unlike the above description, at least one communication module 190 may be disposed only on the second board 520 or on both of the first board 510 and the second board 520.

According to an embodiment, the first side member 413 may form at least a portion of the side of the first housing structure 311. The first side member 413 may have a first edge 413a, a second edge 413b, a third edge 413c, and a fourth edge 413d. The first side member 413 may be spaced apart from the hinge structure 540.

According to an embodiment, the first side member 413 may include a first antenna group 542, a second antenna group 544, and nonconductive members 451, 452, 453, 454, 455, and 456.

In an embodiment, the first antenna group 542 may be may be formed at an edge far from the hinge structure 540 of the edges of the first side member 413, and the second antenna group 544 may be formed at an edge close to the hinge structure 540 of the edges of the first side member 413.

According to an embodiment, the first antenna group 542 may include a first conductive member 441 and a second conductive member 442. In an embodiment, the first antenna group 542 may be electrically connected with the communication module 190 through the first conductive member 441 and the second conductive member 442 to be able to transmit or receive Radio Frequency (RF) signals in various frequency bands.

According to an embodiment, the first conductive member 441 may be disposed over the first edge 413a and the second edge 413b of the first side member 413. The first conductive member 441 may form a partial area of the first edge 413a and a partial area of the second edge 413b. In an embodiment, the first conductive member 441 may be disposed at an edge far from the hinge structure 540 of the edges of the first side member 413. The first conductive member 441 may extend while forming a curved portion or a bending area from a point of the first edge 413a to a point of the second edge 413b. The curved portion may have a curved surface.

According to an embodiment, the first conductive member 441 may form a power supply point and a group point at a point. The power supply point and the group point of the first conductive member 441 may be spaced apart from each other. In an embodiment, an electrical path may be formed to the power supply point and the group point of the first conductive member 441.

In an embodiment, the power supply point of the first conductive member 441 may be electrically connected with at least one power supplier of the first board 510. In an embodiment, the power supply point of the first conductive member 441 may be in direct contact with the first board 510, or may be spaced apart from the first board 510 in which the power supply point and the first board 510 may be electrically or physically connected with the first board 510 by various members (e.g., a C-clip).

In an embodiment, the ground point of the first conductive member 441 may be electrically connected with the ground of the first board 510. The ground point of the first conductive member 441 may be directly connected to the ground of the first board 510 or may be connected to the ground of the first board 510 through another part (e.g., the key input button 317 shown in FIG. 2A) in the first housing structure 311 or other wiring members. In an embodiment, the first conductive member 441 may form a plurality of ground points. In this case, the ground points of the first conductive member 441 may be at different distances from the power supply point.

In an embodiment, the communication module 190 can transmit or receive an RF signal by supplying power to the first conductive member 441 through the power supplier of the first board 510. The first conductive member 441 may operate as an antenna radiator.

According to an embodiment, the resonance frequency band of an RF signal that is transmitted or received by the first conductive member 441 may depend on the physical shape (e.g., the length) of the first conductive member 441. For example, the longer the first conductive member 441, the smaller the resonance frequency band may be.

In an embodiment, an electrical path may be formed to the power supply point and the ground point of the first conductive member 441 and the electrical path may depend on the positions of the power supply point and the ground point. In an embodiment, the resonance frequency band of an RF signal that is transmitted and received by the first conductive member 441 may depend on the electrical paths. For example, the longer the electrical path, the smaller the resonance frequency band of an RF signal, which is transmitted or received by the first conductive member 441, may be. In an embodiment, when the first conductive member 441 have a plurality of ground points, the first conductive member 441 may be used as an antenna radiator for wireless communication in multiple bands.

According to an embodiment, the second conductive member 422 may be disposed apart from the first conductive member 441 and over the first edge 413a and the third edge 413c of the first side member 413. The second conductive member 442 may form a partial area of the first edge 413a and a partial area of the third edge 413c. The second conductive member 442 may extend while forming a curved portion or a bending area from a point of the first edge 413a to a point of the third edge 413c. The curved portion may have a curved surface.

According to an embodiment, the second conductive member 442 is electrically connected with the communication module 190, thereby being able to operate an antenna radiator configured to transmit or receive an RF signal. The configuration and operation principle of the second conductive member 442 as an antenna radiator is the same as those of the first conductive member 441, so repeated description is omitted.

According to an embodiment, the nonconductive members 451, 452, and 453 may be disposed on the first side member 413 of the first housing structure 311. In an embodiment, the nonconductive members 451, 452, and 453 may be made of a dielectric or may include a dielectric material.

According to an embodiment, a first nonconductive member 451 of the nonconductive members may be disposed between the first conductive member 441 and the second conductive member 442. The first conductive member 441 and the second conductive member 442 can be maintained in an electrically separated state by the first nonconductive member 451.

According to an embodiment, a second nonconductive member 452 of the nonconductive members may be disposed at an end of the first conductive member 441 on the second edge 413b.

According to an embodiment, a third nonconductive member 453 of the nonconductive members may be disposed at an end of the second conductive member 442 on the third edge 413c.

In an embodiment, the first side member 413 may not include the second nonconductive member 452 and/or the third nonconductive member 453 of the nonconductive members.

According to an embodiment, the physical shapes (e.g., the lengths) and the electrical paths of the first conductive member 441 and the second conductive member 442 may be different. In an embodiment, the resonance frequency bands of RF signals that are transmitted or received by the first conductive member 441 and the second conductive member 442 may depend on the electrical paths and the physical shape, and the frequency band of the RF signal that is transmitted and received by the first conductive member 441 may be different from the frequency band of the RF signal that is transmitted and received by the second conductive member 442. For example, an RF signal in a low band (e.g., 700 MHz~900 MHz) may be transmitted and received by the first conductive member 441 and an RF signal in a middle band (e.g., 1700 MHz~2100 MHz) may be transmitted and received by the second conductive member 442. As another example, an RF signal in a middle band (e.g., 1700 MHz~2100 MHz) may be transmitted and received by the first conductive member 441 and an RF signal in a high band (e.g., 2300 MHz~2700 MHz) may be transmitted and received by the second conductive member 442. In an embodiment, an RF signal having a frequency in a band higher than that of the first conductive member 441 may be transmitted and received by the second conductive member 442.

According to an embodiment, the first antenna group 542 including the first conductive member 441 and the second conductive member 442 may be used to provide various wireless communication services such as LTE, Bluetooth, GPS (global positioning system), Wi-Fi, depending on the frequency band of an RF signal. In an embodiment, the frequency bands of the RF signals that are transmitted and received by the first conductive member 441 and/or the second conductive member 442 may be configured differently from that described above and may be configured differently in accordance with frequency bands required for providing various wireless communication services.

According to an embodiment, the second antenna group 544 may include a third conductive member 443 and a fourth conductive member 444. In an embodiment, the second antenna group 544 may be electrically connected with the communication module 190 to transmit or receive RF signals in various frequency bands.

According to an embodiment, the third conductive member 443 may be disposed over the second edge 413*b* and the fourth edge 413*d* of the first side member 413. The third conductive member 443 may form a partial area of the second edge 413*b* and a partial area of the fourth edge 413*d*. In an embodiment, the third conductive member 443 may be disposed at an edge close to the hinge structure 540 of the edges of the first side member 413. The third conductive member 443 may extend while forming a curved portion or a bending area from a point of the second edge 413*b* to a point of the fourth edge 413*d*. The curved portion may have a curved surface. According to an embodiment, the shape of the third conductive member 443 may correspond to the shape of the first conductive member 441.

According to an embodiment, the position of the third conductive member 443 may correspond to the position of the first conductive member 441. For example, the third conductive member 443 and the first conductive member 441 may be disposed on the first side member 413 to face each other.

According to an embodiment, the fourth conductive member 444 may be disposed apart from the third conductive member 443 and over the third edge 413*c* and the fourth edge 413*d* of the first side member 413. The fourth conductive member 444 may form a partial area of the third edge 413*c* and a partial area of the fourth edge 413*d*. The fourth conductive member 444 may extend while forming a curved portion or a bending area from a point of the third edge 413*c* to a point of the fourth edge 413*d*. The curved portion may have a curved surface. According to an embodiment, the shape of the fourth conductive member 444 may correspond to the shape of the second conductive member 442.

In an embodiment, the position of the fourth conductive member 444 on the first side member 413 may correspond to the position of the position of the second conductive member 442 on the first side member 413. For example, the fourth conductive member 444 and the second conductive member 442 may be disposed to face each other.

According to various embodiments, the third conductive member 443 and the fourth conductive member 444 are electrically connected with the communication module 190, thereby being able to operate as antenna radiators configured to transmit and receive RF signals. The configurations and operation principles of the third conductive member 443 and the fourth conductive member 444 as antenna radiators are the same as those of the first conductive member 441 and the second conductive member 442 described above, so repeated description is omitted.

According to an embodiment, the nonconductive members 454, 455, and 456 may be disposed on the first side member 413 of the first housing structure 311. In an embodiment, the nonconductive members 454, 455, and 456 may be made of a dielectric or may include a dielectric material.

In an embodiment, a fourth nonconductive member 454 of the nonconductive members may be disposed between the third conductive member 443 and the fourth conductive member 444. The third conductive member 443 and the fourth conductive member 444 can be maintained in an electrically separated state by the fourth nonconductive member 454.

According to an embodiment, a fifth nonconductive member 455 of the nonconductive members may be disposed at an end of the third conductive member 443 on the second edge 413*b*.

According to an embodiment, a sixth nonconductive member 456 of the nonconductive members may be disposed at an end of the fourth conductive member 444 on the third edge 413*c*.

In an embodiment, the first side member 413 may not include the fifth nonconductive member 455 and/or the sixth nonconductive member 456 of the nonconductive members.

According to an embodiment, the frequency bands of RF signals that can be transmitted or received by the second antenna group 544 may be substantially the same as or similar to the frequency bands of RF signals that can be transmitted or received by the first antenna group 542.

In an embodiment, the second side member 414 may form at least a portion of the side of the second housing structure 312. The second side member 414 may have a first edge 414*a*, a second edge 414*b*, a third edge 414*c*, and a fourth edge 414*d*. The second side member 414 may be spaced apart from the hinge structure 540.

According to an embodiment, the second side member 414 may include a third antenna group 546.

In an embodiment, the third antenna group 546 may be disposed at an edge far from the hinge structure 540 of the edges of the second side member 414. In an embodiment, the third antenna group 546 may be electrically connected with the communication module 190 to transmit or receive RF signals in various frequency bands.

According to an embodiment, the third antenna group 546 may include a fifth conductive member 445 and a sixth conductive member 446.

According to an embodiment, the fifth conductive member 445 may be disposed over the first edge 414*a* and the second edge 414*b* of the second side member 414. The fifth conductive member 445 may extend while forming a curved portion or a bending area from a point of the first edge 414*a* to a point of the second edge 414*b*. The curved portion may have a curved surface.

According to an embodiment, the sixth conductive member 446 may be disposed apart from the fifth conductive member 445 and over the first edge 414*a* and the third edge 414*c* of the second side member 414. The sixth conductive member 446 may extend while forming a curved portion from a point of the first edge 414*a* to a point of the third edge 414*c*. The curved portion may have a curved surface.

According to an embodiment, the fifth conductive member 445 and the sixth conductive member 446 are electrically connected with the communication module 190, thereby being able to operate as antenna radiators configured to transmit or receive RF signals. The configurations of the fifth conductive member 445 and the sixth conductive member 446 as antenna radiators are the same as those of the first conductive member 441 and the second conductive member 442 described above, so repeated description is omitted.

According to an embodiment, the nonconductive members 457, 458, and 459 may be disposed on the second side member 414. In an embodiment, the nonconductive members 457, 458, and 459 may be made of a dielectric or may include a dielectric material.

In an embodiment, a seventh nonconductive member 457 of the nonconductive members may be disposed between the fifth conductive member 445 and the sixth conductive member 446. The fifth conductive member 445 and the sixth conductive member 446 can be maintained in an electrically separated state by the seventh nonconductive member 457.

In an embodiment, an eighth nonconductive member 458 of the nonconductive members may be disposed at an end of the fifth conductive member 445 on the second edge 413b of the second side member 414.

In an embodiment, a ninth nonconductive member 459 of the nonconductive members may be disposed at an end of the sixth conductive member 446 on the third edge 414c of the second side member 414.

In an embodiment, the second side member 414 may not include the eighth nonconductive member 458 and/or the ninth nonconductive member 459 of the nonconductive members.

According to an embodiment, the electronic device 101 can use not only the first antenna group 542, the second antenna group 544, and the third antenna group 546, but also a portion of a metal housing not included in the antenna groups as antenna radiators. For example, a conductive section separated by the second conductive member 452 and the fifth conductive member 445 may be formed on the second edge 413b of the first side member 413. The portions of the first side member 413 and/or the second side member 414 separated by the nonconductive members, as described above, can operate as antenna radiators.

In an embodiment, each of the first antenna group 542, the second antenna group 544, the third antenna group 546, and the fourth antenna group (548 in FIG. 8) can operate as an independent module (or an antenna radiator). Unlike the above description, each or a combination of the antenna radiators (e.g., the conductive members 441, 442, 443, 444, 445, and 446) included in the first antenna group 542, the second antenna group 544, the third antenna group 546, and the fourth antenna group (548 in FIG. 8) can operate as an independent module (or an antenna radiator). The 'antenna group' stated herein may be a terminology defined for the convenience of description to designate antenna radiators included therein.

According to an embodiment, some of the antenna radiators disposed on the first side member 413 and the second side member 414 may be antennas that are excited and operated by an adjacent antenna radiator without specific supply of power.

According to an embodiment, the hinge structure 540 may be disposed between the first housing structure 311 and the second housing structure 312. The hinge structure 540 can connect the first housing structure 311 and the second housing structure 312 to each other and the electronic device 101 can be folded or unfolded about the hinge structure 540. In an embodiment, the hinge structure 540 may be spaced apart from the first side member 413 and the second side member 414.

Figure 5:
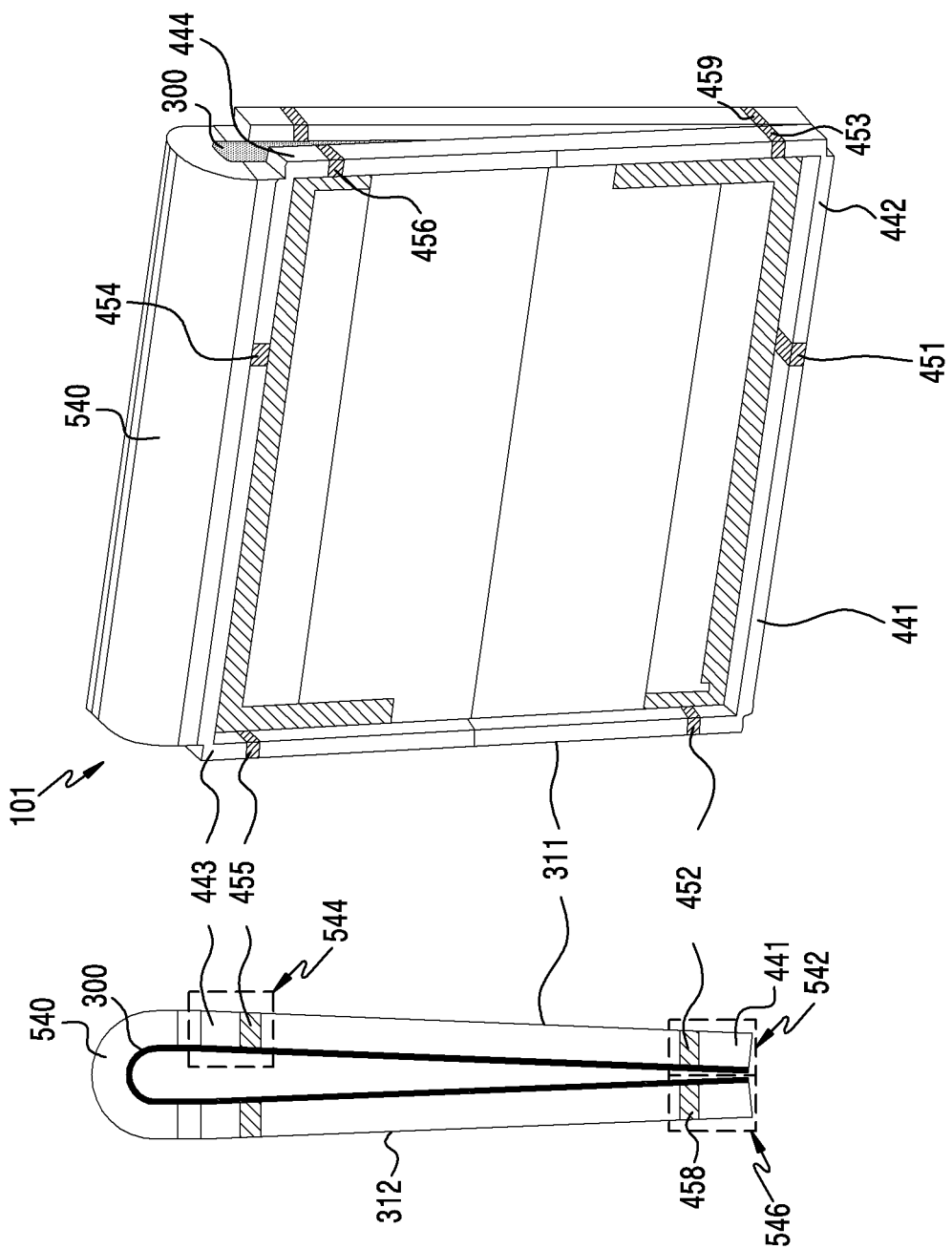
FIG. 5 is a diagram showing a folded state of an electronic device according to an embodiment of the disclosure.

FIG. 5 is a diagram showing a folded state of an electronic device according to an embodiment of the disclosure.

Figure 6:
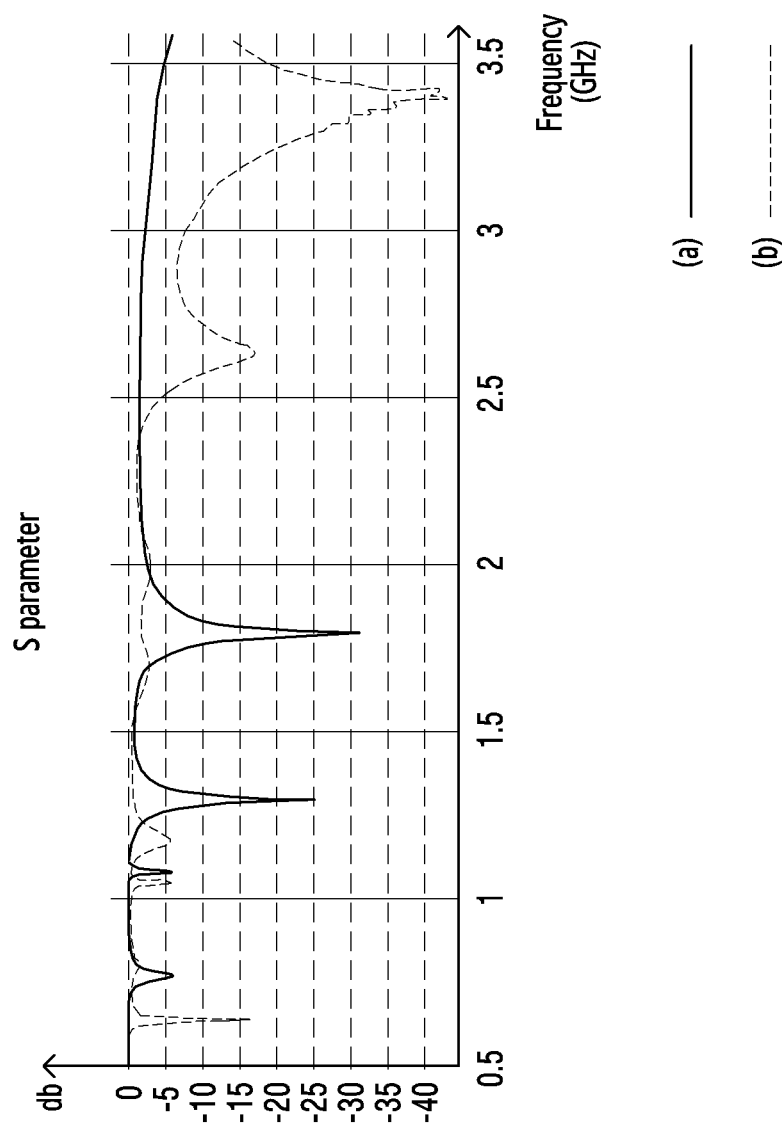
FIG. 6 is a graph showing radiation performance of an antenna in an unfolded state or a folded state of an electronic device according to an embodiment of the disclosure.
Figure 7A:
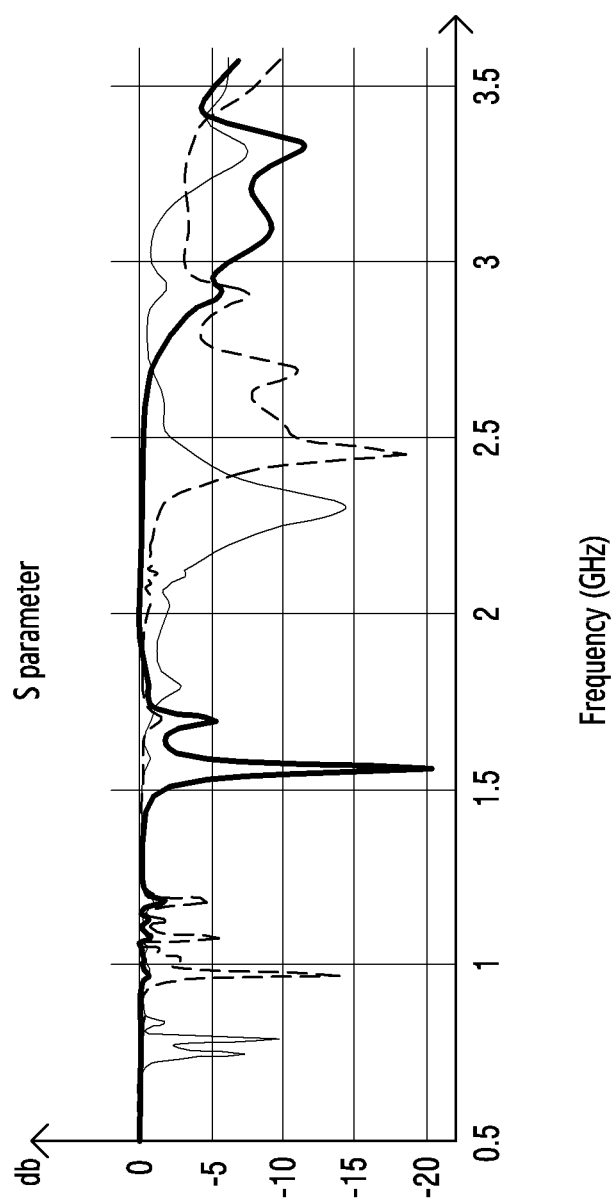
FIG. 7A is a graph showing radiation performance of an antenna in an unfolded state of an electronic device according to an embodiment of the disclosure.
Figure 7B:
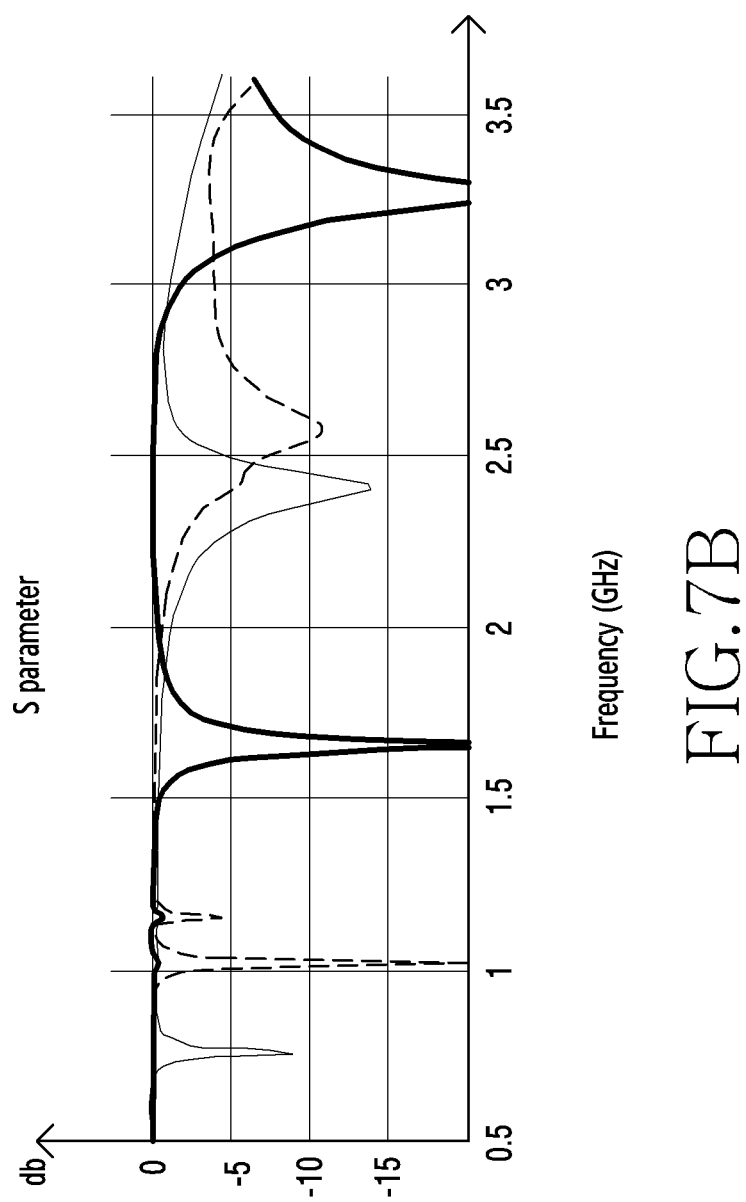
FIG. 7B is a graph showing radiation performance of an antenna in a folded state of an electronic device according to an embodiment of the disclosure.

FIG. 6 is a graph showing radiation performance of an antenna in an unfolded state or a folded state of an electronic device according to an embodiment of the disclosure, FIG. 7A is a graph showing radiation performance of an antenna in an unfolded state of an electronic device according to an embodiment of the disclosure, and FIG. 7B is a graph showing radiation performance of an antenna in a folded state of an electronic device according to an embodiment of the disclosure.

Referring to FIG. 5, only it is different that the electronic device 101 is in a folded state, as compared with FIG. 4, so repeated description is omitted.

In an embodiment, the electronic device 101 may include a flexible display 300.

In an embodiment, the flexible display 300 may form a front surface (e.g., the front surface 315 shown in FIG. 2A) of the electronic device 101 when the electronic device 101 is in an unfolded state. The flexible display 300 may extend from the first housing structure 311 to the second housing structure 312 across the hinge structure 540. In an embodiment, the flexible display 300 can be at least partially bent when the electronic device 101 is folded. The flexible display 300 can be folded when the electronic device 101 is in the folded state.

In an embodiment, at least two of the nonconductive members 451, 452, and 453 may be integrally formed. For example, the first nonconductive member 451 may extend into the first housing structure 311 and may extend to the second conductive member 452 and/or the third conductive member 453 along the inner side of the first housing structure 311. Unlike the above description, the first nonconductive member 451, the second nonconductive member 452, and the third nonconductive member 453 may be separately formed.

Similarly, the description of the first conductive member 451, the second conductive member 452, and the third conductive member 453 may be applied respectively to the fourth conductive member 454, the fifth conductive member 455, and the sixth conductive member 456 or to the seventh conductive member 457, the eighth conductive member 458, and the ninth conductive member 459.

In an embodiment, the position of the first antenna group 542 may correspond to the position of the third antenna group 546. For example, when the electronic device 101 is in the folded state, the first housing structure 311 may overlap the second housing 312, or when the electronic device 101 is in the folded state, the first antenna group 542 may overlap the third antenna group 546 or may be positioned close to the third antenna group 546.

In an embodiment, when the electronic device 101 is in the unfolded state, a first frequency band of an RF signal that is transmitted and received by the first antenna group 542 may be substantially the same as or similar to a second frequency band of an RF signal that is transmitted and received by the third antenna group 546. For example, a portion or most of the first frequency band may overlap the second frequency band.

In an embodiment, when the electronic device 101 is in the folded state, the radiation performance of the first antenna group 542 and the third antenna group 546 that are adjacent to each other may deteriorated due to mutual interference.

For example, referring to the graph (a) in FIG. 6, the first antenna group 542 or the third antenna group 546 may form a resonance frequency band of about 1.3 GHz or about 1.8 GHz when the electronic device 101 is in the unfolded state.

Referring to the graph (b) in FIG. 6, the first antenna group 542 or the third antenna group 546 may form a resonance frequency band of about 2.6 GHz or about 3.4 GHz when the electronic device 101 is in the folded state. When the electronic device 101 is folded, the resonance frequency band and the radiation pattern may be changed and the radiation performance in an intended frequency band may be deteriorated by mutual interference of the first antenna group 542 and the third antenna group 546.

In an embodiment, when the electronic device 101 is in the unfolded state, a third frequency band of an RF signal that is transmitted and received by the second antenna group 544 may be substantially the same as or similar to the first frequency band of the first antenna group 542 or the second frequency band of the third antenna group 546. For example, a portion or most of the third frequency band may overlap the first frequency band or the second frequency band.

According to an embodiment, even though the electronic device 101 is in the folded state, the second antenna group 544 can radiate an RF signal in a fourth frequency band that is substantially the same as or similar to the third frequency band in the unfolded state.

For example, the third frequency band of the second antenna group 544 when the electronic device 101 is in the unfolded state which is shown in FIG. 7A may be substantially the same as or similar to the fourth frequency band of the second antenna group 544 when the electronic device 101 is in the folded state which is shown in FIG. 7B. Most of the third frequency band may overlap the fourth frequency band.

Figure 8:
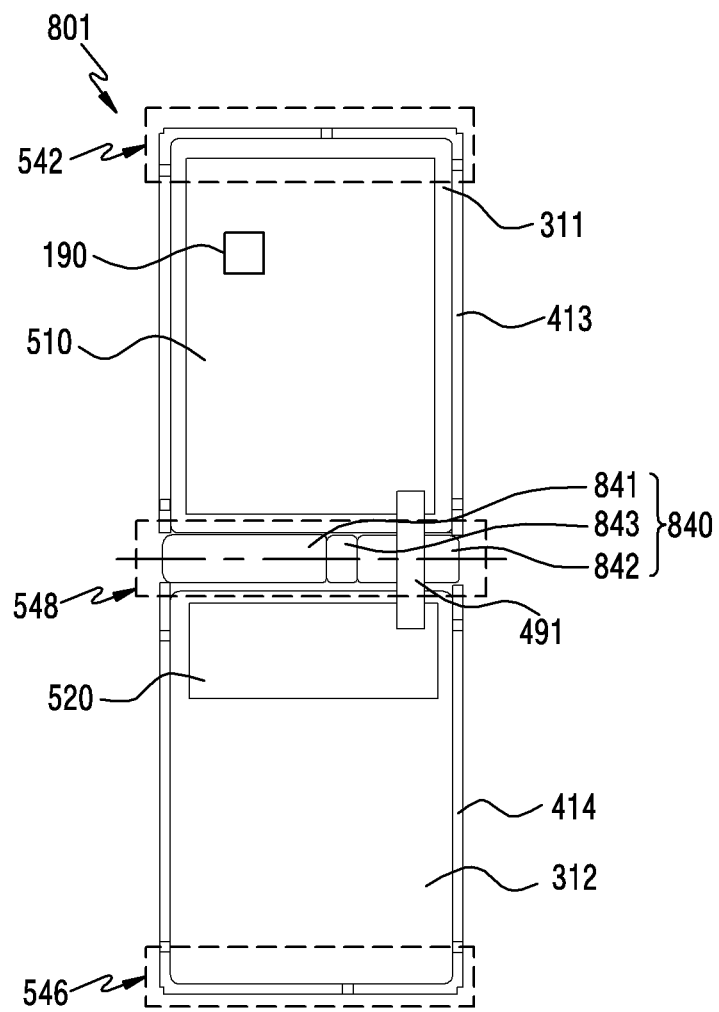
FIG. 8 is a diagram showing an unfolded state of an electronic device according to an embodiment of the disclosure.

FIG. 8 is a diagram showing an unfolded state of an electronic device according to an embodiment of the disclosure.

For the convenience of description, the display 300 of the electronic device 801 is not shown in FIG. 8. The display 300 of an electronic device 801 may be disposed to cover the components (board, etc.) shown in FIG. 8 so that the components are not exposed to the outside.

The electronic device 801 shown in FIG. 8 may not include the second antenna group 544, unlike the electronic device 101 shown in FIGS. 4 and 5. In the following description referring to FIG. 8, only different components from those of the first electronic device 101 shown in FIGS. 4 and 5 is stated and the same components are not stated.

According to an embodiment, the electronic device 810 may include a fourth antenna group 548. In an embodiment, the fourth antenna group 548 may be electrically connected with the communication module 190 to transmit or receive RF signals in various frequency bands.

According to an embodiment, a hinge structure 840 may have a first section 841, a second section 842, and a third section 843 between the first section 841 and the second section 842.

According to an embodiment, the hinge structure 840 may include the fourth antenna group 548 and the fourth antenna group 548 may include the first section 841 and the second section 842 of the hinge structure 840.

In an embodiment, the first section 841 and the second section 842 may be made of a conductive material or may include a conductive material. In an embodiment, the third section 843 may be made of a nonconductive material or may include a nonconductive material. In an embodiment, the first section 841 and the second section 842 may be maintained in an electrically separated state by the third section 843. In an embodiment, the first section 841 and the second section 842 may be spaced apart from the first side member 413 and the second side member 414.

In an embodiment, the first section 841 may be electrically connected with the first board 510 and/or the second board 520. For example, the first section 841 may be electrically connected with the first board 510 and/or the second board 520 by another connection member discriminated from the wiring member 391. Various members such as a metal wire, a flexible printed circuit board (FPCB), C-clip, a conductive gasket may be used as the connection member, and the connection member is not limited thereto.

As another example, the first section 841 may be electrically connected with the first board 510 and/or the second board 520 without a specific member.

In an embodiment, the first section 841 may form a power supply point and a ground point. The power supply point may be in direct contact with the power supplier of the first board 510 or the power supplier of the second board 520, or may be spaced apart from the first board 510 or the second board 520 and electrically connected with the power supplier of the first board 510 or the power supplier of the second board 520 by another connection member. In an embodiment, the ground point of the first section 841 may be electrically connected with the ground of the first board 510 or the second board 520.

In an embodiment, an electrical path may be formed through the power supply point and the ground point formed in the first section 841 and the communication module 190 can transmit or receive an RF signal by supplying power to the first section 841. The first section 841 of the hinge structure 840 may be used as an antenna radiator configured to transmit or receive an RF signal.

In an embodiment, the frequency band of an RF signal that is transmitted or received by the first section 841 may depend on a physical shape (e.g., a length) of the first section 841 or the electrical path formed in the first section 841.

According to an embodiment, the second section 842 is electrically connected with the communication module 190, thereby being able to operate an antenna radiator configured to transmit or receive an RF signal. The configuration and operation principle of the second section 842 as an antenna radiator are the same as those of the first section 841, so repeated description is omitted.

According to an embodiment, the frequency bands of RF signals that are transmitted and received by the first section 841 and the second section 842 may be different from each other.

According to an embodiment, the frequency band of an RF signal that can be transmitted and received by the fourth antenna group 548 including the first section 841 and the second section 842 may be substantially the same as or similar to the first frequency band of the first antenna group 542 or the frequency band of an RF signal that can be transmitted and received by the third antenna group 546. For example, a portion or most of the frequency band of the signal that is transmitted and received by the fourth antenna group 548 may overlap the frequency band of the signal that is transmitted and received by the first antenna group 542 or the third antenna group 546.

Unlike the above description, the electronic device 801 can use only one of the first section 841 and the second section 842 as an antenna radiator. For example, it is possible to use the first section 841 as an antenna radiator and use the second section 842 as a space for mounting the wiring member 391 or another part (e.g., a specific antenna module configured to transmit and receive a signal in a mmWave band).

Figure 9:
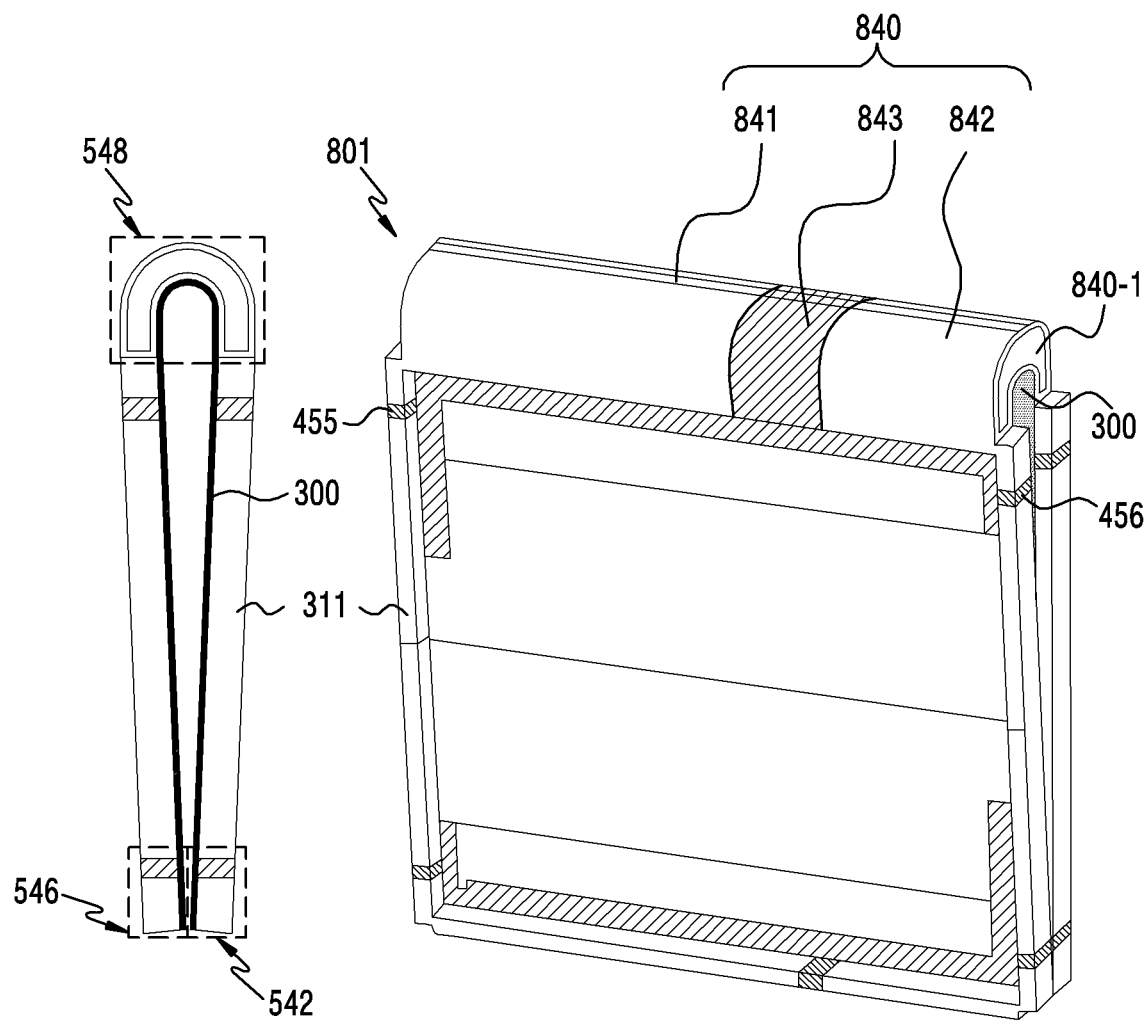
FIG. 9 is a diagram showing a folded state of an electronic device according to an embodiment of the disclosure.

FIG. 9 is a diagram showing a folded state of the electronic device 801 according to an embodiment of the disclosure.

Referring to FIG. 9, according to an embodiment, the third section 843 may be integrally formed with the fifth conductive member 455 and/or the sixth conductive member 456. For example, the third section 843 may extend into the first housing structure 311 and may extend to the fifth conductive member 455 and/or the sixth conductive member 456 along the edge in the first housing structure 311. The portion of the third section 843 that extends into the first housing structure 311 may be formed in the same way in the second housing structure 312. Unlike the above description, the third section 843 may be independently separated from other nonconductive members.

In an embodiment, a spacing space 840-1 may be defined in the hinge structure 840. The spacing space 840-1 may be formed over the first section 841, the second section 842, and the third section 843 of the hinge structure 840. The spacing space 840-1 may be filled with a nonconductive material such as plastic. The material filling the spacing space 840-1 may be formed by injection molding. In an embodiment, the nonconductive material filling the spacing space 840-1 and the nonconductive material forming the third section 843 may be integrally formed.

Unlike the above description, the hinge structure 840 may not have the spacing space 840-1. The frequency band and the radiation pattern of an RF signal that is transmitted and received by the hinge structure 540 may depend on whether there is the spacing space 840-1, the thickness of the spacing space 840-1, and the material filling the spacing space 840-1. In an embodiment, the spacing space 840-1 may be preferably designed in consideration of the required frequency band or signal interference by another part (e.g., the display 300).

According to an embodiment, when the electronic device 801 is in the folded state, the first antenna group 542 and the third antenna group 546 may be positioned close to each other. In this case, the frequency bands of RF signals that are transmitted and received by the first antenna group 542 and the third antenna group 546 or the radiation performance of the first antenna group 542 and the third antenna group 546 may be deteriorated.

According to an embodiment, the fourth antenna group 548 can transmit and receive RF signals substantially in the same or similar band regardless of whether the electronic device 801 is in the folded state or the unfolded state.

In an embodiment, even if the performance as an antenna radiator of the first antenna group 542 or the third antenna group 546 is deteriorated with the electronic device 801 in the folded state, the electronic device 801 can maintain substantially the same or improved antenna performance using the fourth antenna group 548, as compared with the unfolded state.

Figure 10:
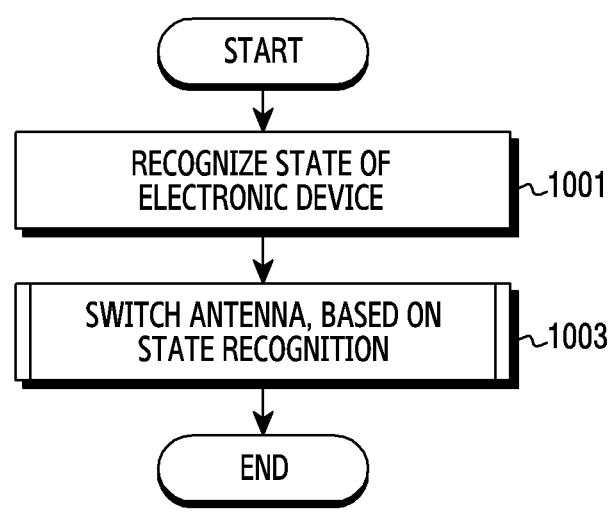
FIG. 10 is a flowchart showing a method in which an electronic device switches an antenna group according to an embodiment of the disclosure.

FIG. 10 is a flowchart showing a method in which an electronic device switches an antenna group according to an embodiment of the disclosure.

The method shown in FIG. 10 and embodiments to be described below may be implemented by the electronic device 101 shown in FIG. 4, the electronic device 801 shown in FIG. 8, or the processor 120 of an electronic device.

The electronic device 101 shown in FIG. 4 is referred to in the description of FIG. 10 and the following description, but, they may be applied, for example, to the electronic device 801. For example, the description of the second antenna group 544 of the electronic device 101 may be applied to the fourth antenna group 548 of the electronic device 801.

Figure 11:
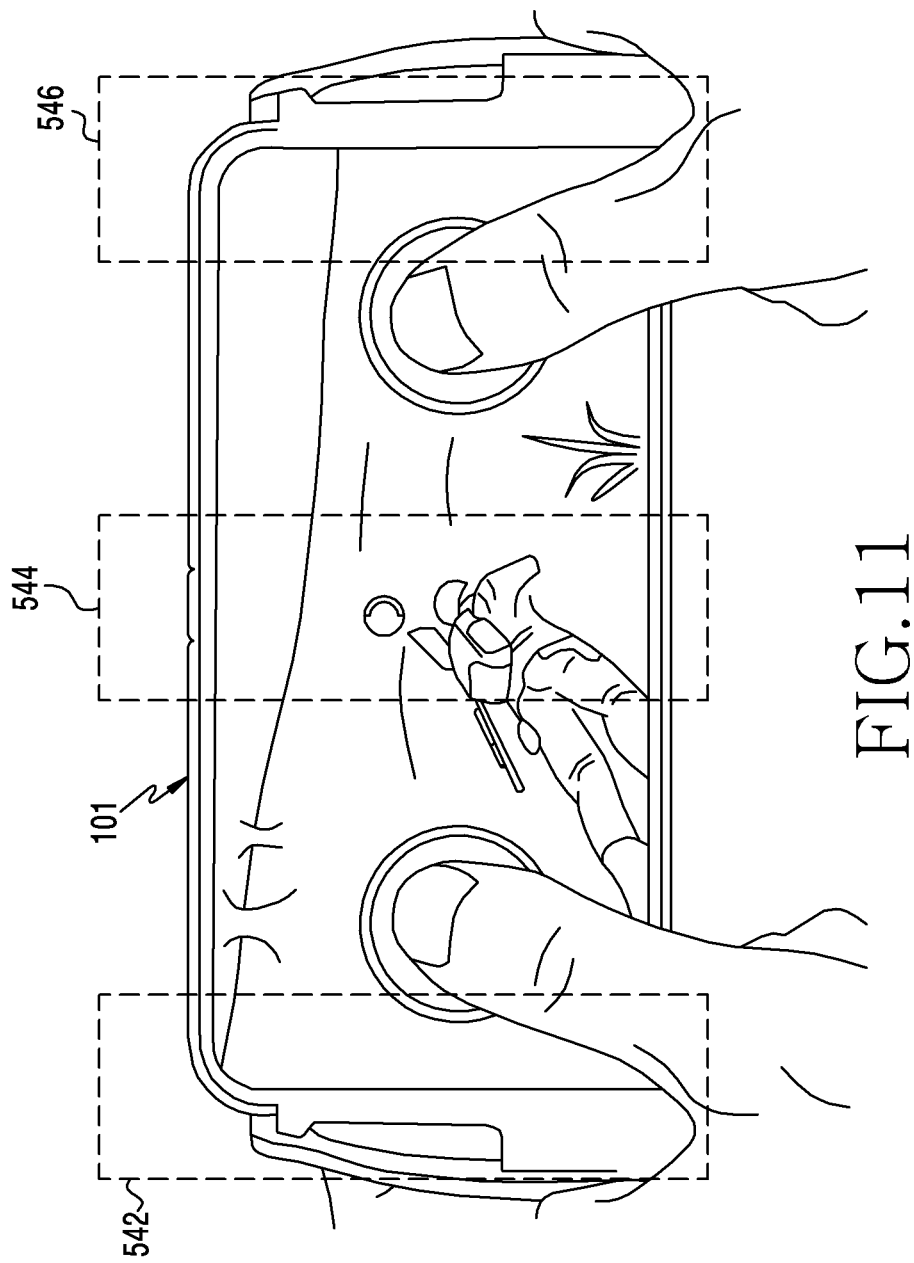
FIG. 11 is a diagram showing an electronic device according to an embodiment of the disclosure.
Figure 12:
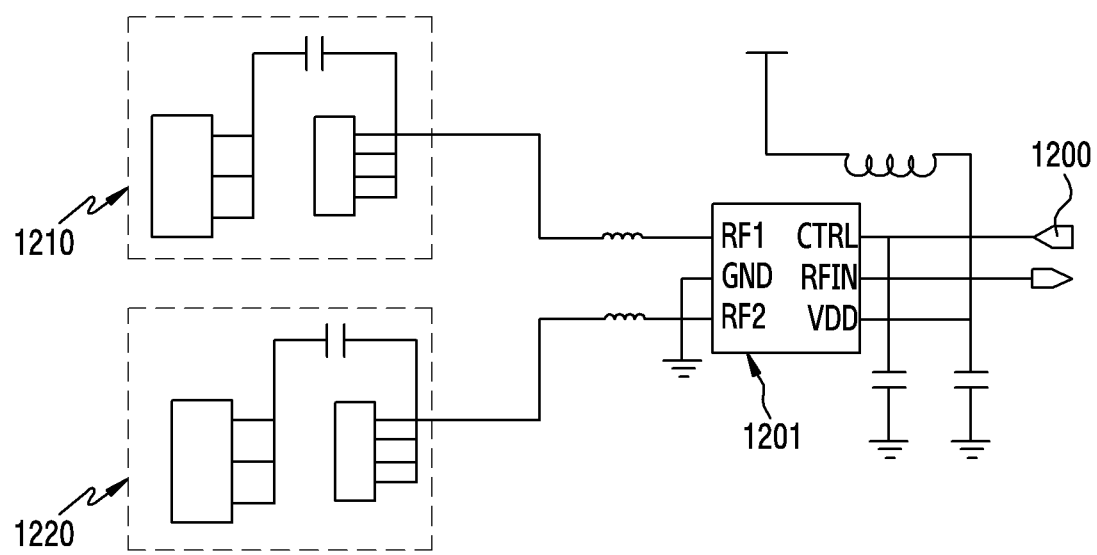
FIG. 12 is a circuit diagram showing an antenna switch circuit of an electronic device according to an embodiment of the disclosure.
Figure 13:
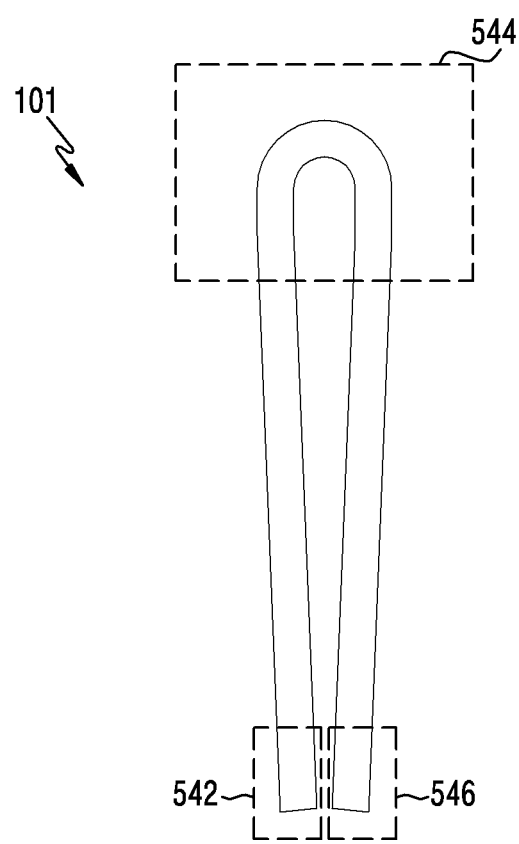
FIG. 13 is a diagram showing an electronic device according to an embodiment of the disclosure.

FIG. 11 is a diagram showing an electronic device according to an embodiment of the disclosure, FIG. 12 is a circuit diagram showing an antenna switch circuit of an electronic device according to an embodiment of the disclosure, and FIG. 13 is a diagram showing an electronic device according to an embodiment of the disclosure.

Referring to FIG. 10, in operation 1001, the processor 120 can recognize the state of the electronic device 101.

For example, the processor 120 can recognize whether voltage is applied to the sub-display 304, and can recognize the posture of the electronic device 101 on the basis of the recognition result. While the electronic device 101 is in the folded state, voltage can be applied to the touch screen panel of the sub-display 304. For example, the voltage that is applied to the touch screen panel while the electronic device 101 is in the folded state may be maintained at 1.8V. While the electronic device 101 is in the unfolded state, voltage may not be applied to the touch screen panel of the sub-display 304. For example, the voltage that is applied to the touch screen panel while the electronic device 101 is in the unfolded state may be maintained at 0V. The processor 120 can recognize that the electronic device 101 is in the folded state by recognizing that voltage is applied to the touch screen panel of the sub-display 304. The processor 120 can recognize that the electronic device 101 is in the unfolded state by recognizing that voltage is not applied to the touch screen panel of the sub-display 304.

As another example, the processor 120 can recognize whether the electronic device 101 is in the folded state or the unfolded state through the sensor module 176 (e.g., a gyro sensor, an acceleration sensor, or a hall sensor). The sensor module 176 can sense the posture of the electronic device 101 and can generate data corresponding to the sensed state. The sensor module 176 can provide the generated data to the processor 120. The processor 120 can recognize the posture of the electronic device 101, based on the provided data.

As another example, referring to FIG. 11, the processor 120 can recognize whether the electronic device 101 is held by a user or whether electronic device 101 is in contact with the body of a user. The sensor module 176 (e.g., a grip sensor) can sense whether the electronic device 101 is held by a user or whether electronic device 101 is in contact with the body of a user, and can generate data corresponding to the sensed state. The sensor module 176 can provide the generated data to the processor 120. The processor 120 can recognize whether the electronic device 101 is held by a user or whether electronic device 101 is in contact with the body of a user, based on the provided data. In an embodiment, the area of the electronic device 101 that is held by a user or is in contact with the body of a user may include at least a portion of the first antenna group 542 and at least a portion of the third antenna group 546.

As another example, the processor 120 can detect the communication coverage of the electronic device 101. The processor 120 can obtain data about a Received Signal Strength Indicator (RSSI), Reference Signal Received Power (RSRP), and Reference Signal Received Quality (RSRQ) of the first antenna group 542, the second antenna group 544, and the third antenna group 546 through the communication module 192. The processor 120 can detect the communication coverage of each of the first antenna group 542, the second antenna group 544, and the third antenna group 546, based on the obtained data.

In operation 1003, the processor 120 can switch an antenna, based on the recognized state of the electronic device 101.

For example, referring to FIG. 12, the processor 120 can change the RF signal path from RF1 to RF2 through a switching circuit 1201, based on the result of recognizing that the electronic device 101 is in the folded state. In this case, a first antenna group 1210 (e.g., the first antenna group 542 or the third antenna group 546) may be inactivated and a second antenna group 1220 (e.g., the second antenna group 544) may be activated. In an embodiment, the processor 120 can change the RF signal path from RF2 to RF1 through a switching circuit 1200, based on the result of recognizing that the electronic device 101 is in the unfolded state. In this case, the first antenna group 1210 may be activated and the second antenna group 1220 may be inactivated. In an embodiment, the activated state of an antenna group (or an antenna) may mean that wireless communication is being performed by the antenna group (or an antenna). In an embodiment, the inactivated state of an antenna group (or an antenna) may mean that wireless communication is not being performed by the antenna group (or an antenna).

As another example, referring to FIG. 11, the processor 120 can activate the second antenna group 544, based on the result of recognizing that the electronic device 101 is held by a user.

As another example, referring to FIG. 11, the processor 120 can change the antenna groups to be activated, based on the detected communication coverage.

In an embodiment, when the body of a use is in contact with at least a portion of the first antenna group 542 or an area adjacent to the first antenna group 542, the communication coverage of the first antenna group 542 may be reduced. When the communication coverage of the first antenna group 542 decreases under the communication coverage of the second antenna group 544 or the third antenna group 546, the processor 120 can inactivate the first antenna group 542 and activate the second antenna group 544 or the third antenna group 546.

In an embodiment, when the body of a use is in contact with at least a portion of the third antenna group 546 or an area adjacent to the third antenna group 546, the communication coverage of the third antenna group 546 may be reduced. When the communication coverage of the third antenna group 546 decreases under the communication coverage of the first antenna group 542 or the second antenna group 544, the processor 120 can inactivate the third antenna group 546 and activate the first antenna group 542 or the second antenna group 544.

As another example, referring to FIG. 13, since the first antenna group 542 and the third antenna group 546 are adjacent to each other when the electronic device 101 is in the folded state, the communication coverage of the first antenna group 542 and the third antenna group 546 may decrease. In this case, the processor 120 can inactivate any one of the first antenna group 542 and/or the third antenna group 546 and activate the second antenna group 544.

In an embodiment, the processor 120 can selectively activate or inactivate the first antenna group 542, the second antenna group 544, and the third antenna group 546, depending on the state of the electronic device 101, to achieve substantially the same or improved antenna performance.

An electronic device according to various embodiments includes: a housing that is configured to form a rear surface and a side of the electronic device when the electronic device is in an unfolded state, that includes a first housing structure having a first side member configured to form at least a partial area of the side, a second housing structure having a second side member configured to form at least a partial area of the other area of the side, and a hinge structure configured to connect the first housing structure and the second housing structure to each other, and that can be changed into a folded state or an unfolded state about the hinge structure; a flexible display that is disposed in a space defined by the housing, is configured to form a front surface of the electronic device when the electronic device is in the unfolded state, and has a first section corresponding to the first housing structure and a second section corresponding to the second housing structure, in which the first section and the second section face each other when the electronic device is in the folded state; and a communication module that is electrically connected with the first side member and the second side member to receive a wireless communication signal, in which the first side member may include: a first antenna group including a first conductive member disposed an edge far from the hinge structure of edges of the first side member and a second conductive member spaced apart from the first conductive member; and a second antenna group including a third conductive member disposed at an edge adjacent to the hinge structure of the edges of the first side member to be opposite to the first conductive member and a fourth conductive member spaced apart from the third conductive to be opposite to the second conductive member, and the second side member may include a third antenna group. The third antenna group may include a fifth conductive member disposed at an edge far from the hinge structure of edges of the second side member and a sixth conductive member spaced apart from the fifth conductive member.

The electronic device according to an embodiment may further include: at least one sensor configured to sense the folded state or the unfolded state of the housing; and at least one processor operationally connected with the flexible display, the at least one sensor, the first antenna group, the second antenna group, and the third antenna group, in which the at least one processor may be configured to recognize the folded state or the unfolded state of the housing, and to activate the second antenna group and inactivate the first antenna group, based on recognition of the folded state.

The electronic device according to an embodiment may further include a sub-display disposed on a rear surface of the first housing structure or a rear surface of the second housing structure.

The electronic device according to an embodiment may further include: at least one processor operationally connected with the flexible display, the sub-display, the first antenna group, the second antenna group, and the third antenna group, in which the at least one processor may be configured to recognize whether voltage is applied to the sub-display, and to activate the second antenna group and inactivate the first antenna group, based on the recognition.

In an embodiment, the third conductive member and the fourth conductive member may be spaced apart from the hinge structure.

In an embodiment, the third conductive member and the fourth conductive member may have different lengths.

In an embodiment, the shape of the first conductive member may correspond to the shape of the third conductive member, and the shape of the second conductive member may correspond to the shape of the fourth conductive member.

The electronic device according to an embodiment may further include a first nonconductive member disposed between the first conductive member and the second conductive member, and a second nonconductive member disposed between the third conductive member and the fourth conductive member, in which the position of the first nonconductive member may correspond to the position of the second nonconductive member.

In an embodiment, the second side member may further include: a seventh conductive member disposed at an edge adjacent to the hinge structure to be opposite to the fifth conductive member; an eighth conductive member spaced apart from the seventh conductive member; and a fourth nonconductive member disposed between the seventh conductive member and the eighth conductive member.

In an embodiment, when the electronic device is in the folded state, at least a portion of the first conductive member may overlap the fifth conductive member and at least a portion of the second conductive member may overlap the sixth conductive member.

An electronic device according to various embodiments includes: a housing that is configured to form a rear surface and a side of the electronic device when the electronic device is in an unfolded state, that includes a first housing structure having a first side member configured to form at least a partial area of the side, a second housing structure having a second side member configured to form at least a partial area of the other area of the side, and a hinge structure configured to connect the first housing structure and the second housing structure to each other, and that can be changed into a folded state or an unfolded state about the hinge structure; a flexible display that is disposed in a space defined by the housing, is configured to form a front surface of the electronic device when the electronic device is in the unfolded state, and has a first section corresponding to the first housing structure and a second section corresponding to the second housing structure, in which the first section and the second section face each other when the electronic device is in the folded state; and a communication module that is electrically connected with the first side member, the second side member, and the hinge structure to receive a wireless communication signal, in which the first side member may include a first antenna group including a first conductive member disposed an edge far from the hinge structure of edges of the first side member and a second conductive member spaced apart from the first conductive member; the second side member may include a second antenna group including a third conductive member disposed at an edge far from the hinge structure of edges of the second side member and a fourth conductive member spaced apart from the third conductive member; and the hinge structure may include a third antenna group a fifth conductive member configured to form a first part of the hinge structure and a sixth conductive member spaced apart from the fifth conductive member and configured to form a second part of the hinge structure.

The electronic device according to an embodiment may further include: at least one sensor configured to sense the folded state or the unfolded state of the housing; and at least one processor operationally connected with the flexible display, the at least one sensor, the first antenna group, the second antenna group, and the third antenna group, in which the at least one processor may be configured to recognize the folded state or the unfolded state of the housing, and to activate the third antenna group and inactivate the first antenna group, based on recognition of the folded state.

The electronic device according to an embodiment may further include a sub-display disposed in at least a partial area of a rear surface of the electronic device.

The electronic device according to an embodiment may further include: at least one processor operationally connected with the flexible display, the sub-display, the first antenna group, the second antenna group, and the third antenna group, in which the at least one processor may be configured to recognize whether voltage is applied to the sub-display, and to activate the third antenna group and inactivate the first antenna group, based on the recognition.

In an embodiment, the fifth conductive member and the sixth conductive member may be spaced apart from the first side member and the second side member.

In an embodiment, the fifth conductive member and the sixth conductive member may have different lengths.

In an embodiment, the hinge structure may further include a third nonconductive member disposed between the fifth conductive member and the sixth conductive member, the third nonconductive member may form a third part of the hinge structure, and the hinge structure may have a spacing space overlapping the first part, the second part, and the third part in the hinge structure.

In an embodiment, the hinge structure may further include a third nonconductive member disposed between the fifth conductive member and the sixth conductive member; the third nonconductive member may form a third part of the hinge structure; the first part, the second part, and the third part of the hinge structure form at least a portion of an area through which the hinge structure is shown to the outside; the hinge structure may have a spacing section overlapping the first part and the second part in the hinge structure; and the spacing section may be made of a nonconductive material.

In an embodiment, the hinge structure may have a third part between the first part and the second part, the hinge structure may include a hinge cover shown to the outside, and the first part, the second part, and the third part of the hinge structure may form the hinge cover.

The electronic device according to an embodiment may further include: a grip sensor; and at least one processor operationally connected with the grip sensor, the first antenna group, the second antenna group, and the third antenna group, in which the at least one processor may be configured to recognize whether the body of a user of the electronic device comes in contact with at least a portion of the first side member and at least a portion of the second side member using the grip sensor, and to activate the third antenna group, based on the recognition.

In the above-described specific embodiments of the disclosure, components included in the disclosure are expressed in the singular or plural according to the presented specific embodiments. However, the singular or plural expression is selected appropriately for the situation presented for convenience of description, and the disclosure is not limited to the singular or plural constituent elements, and even constituent elements expressed in plural are composed of the singular or in the singular. Even the expressed constituent elements may be composed of pluralities.

While the disclosure has been shown and described with reference to various embodiments thereof, it will be understood by those skilled in the art that various changes in form and details may be made therein without departing from the spirit and scope of the disclosure as defined by the appended claims and their equivalents

What is claimed is:

1. An electronic device comprising:
   a housing configured to form a rear surface and a side of the electronic device in case the electronic device is in an unfolded state, the housing including:
   a first housing structure having a first side member configured to form at least a first partial area of the side;
   a second housing structure having a second side member configured to form at least a second partial area of the side; and
   a hinge structure configured to connect the first housing structure and the second housing structure to each other, the housing configured to be changed into a folded state or an unfolded state about the hinge structure;
   a flexible display disposed in a space defined by the housing, wherein the flexible display configured to:
   form a front surface of the electronic device in case the electronic device is in the unfolded state, and include a first section corresponding to the first housing structure and a second section corresponding to the second housing structure, in which the first section and the second section face each other in case the electronic device is in the folded state; and
a transceiver electrically connected with the first side member and the second side member to receive a wireless communication signal,
wherein the first side member includes:
a first antenna group including a first conductive member disposed on an edge distant from the hinge structure, edges of the first side member and a second conductive member being spaced apart from the first conductive member, and
a second antenna group including a third conductive member disposed at an edge adjacent to the hinge structure of the edges of the first side member to be opposite to the first conductive member and a fourth conductive member spaced apart from the third conductive member to be opposite to the second conductive member, and
wherein the second side member includes a third antenna group including a fifth conductive member disposed at an edge distant from the hinge structure, edges of the second side member and a sixth conductive member being spaced apart from the fifth conductive member.

2. The electronic device of claim 1, further comprising:
at least one sensor configured to sense the folded state or the unfolded state of the housing; and
at least one processor operationally connected with the flexible display, the at least one sensor, the first antenna group, the second antenna group, and the third antenna group,
wherein the at least one processor is configured to:
recognize the folded state or the unfolded state of the housing, and
activate the second antenna group and inactivate the first antenna group, based on recognition of the folded state.

3. The electronic device of claim 1, further comprising:
a sub-display disposed on at least one of a rear surface of the first housing structure or a rear surface of the second housing structure.

4. The electronic device of claim 3, further comprising:
at least one processor operationally connected with the flexible display, the sub-display, the first antenna group, the second antenna group, and the third antenna group,
wherein the at least one processor is configured to:
recognize whether voltage is applied to the sub-display, and
activate the second antenna group and inactivate the first antenna group, based on the recognition of the voltage being applied to the sub-display.

5. The electronic device of claim 1, wherein the third conductive member and the fourth conductive member are spaced apart from the hinge structure.

6. The electronic device of claim 1, wherein the third conductive member and the fourth conductive member include different lengths.

7. The electronic device of claim 1,
wherein a shape of the first conductive member corresponds to a shape of the third conductive member, and
wherein a shape of the second conductive member corresponds to a shape of the fourth conductive member.

8. The electronic device of claim 1, further comprising:
a first nonconductive member disposed between the first conductive member and the second conductive member; and
a second nonconductive member disposed between the third conductive member and the fourth conductive member,
wherein a position of the first nonconductive member corresponds to a position of the second nonconductive member.

9. The electronic device of claim 1, wherein the second side member further includes:
a seventh conductive member disposed at an edge adjacent to the hinge structure to be opposite to the fifth conductive member;
an eighth conductive member spaced apart from the seventh conductive member; and
a fourth nonconductive member disposed between the seventh conductive member and the eighth conductive member.

10. The electronic device of claim 1, wherein in case the electronic device is in the folded state, at least a portion of the first conductive member overlaps the fifth conductive member and at least a portion of the second conductive member overlaps the sixth conductive member.

11. An electronic device comprising:
a housing configured to form a rear surface and a side of the electronic device in case the electronic device is in an unfolded state, the housing including:
a first housing structure having a first side member configured to form at least a first partial area of the side;
a second housing structure having a second side member configured to form at least a second partial area of the side; and
a hinge structure configured to connect the first housing structure and the second housing structure to each other, the housing configured to be changed into a folded state or an unfolded state about the hinge structure;
a flexible display disposed in a space defined by the housing, wherein the flexible display configured to:
form a front surface of the electronic device in case the electronic device is in the unfolded state, and
include a first section corresponding to the first housing structure and a second section corresponding to the second housing structure, in which the first section and the second section face each other in case the electronic device is in the folded state; and
a transceiver electrically connected with the first side member, the second side member, and the hinge structure to receive a wireless communication signal,
wherein the first side member includes a first antenna group including a first conductive member disposed an edge distant from the hinge structure, edges of the first side member and a second conductive member being spaced apart from the first conductive member,
wherein the second side member includes a second antenna group including a third conductive member disposed at an edge distant from the hinge structure, edges of the second side member and a fourth conductive member being spaced apart from the third conductive member, and
wherein the hinge structure includes a third antenna group a fifth conductive member configured to form a first part of the hinge structure and a sixth conductive member spaced apart from the fifth conductive member and configured to form a second part of the hinge structure.

12. The electronic device of claim 11, further comprising:
at least one sensor configured to sense the folded state or the unfolded state of the housing; and
at least one processor operationally connected with the flexible display, the at least one sensor, the first antenna group, the second antenna group, and the third antenna group,
wherein the at least one processor is configured to:
recognize the folded state or the unfolded state of the housing, and
activate the third antenna group and inactivate the first antenna group, based on recognition of the folded state.

13. The electronic device of claim 11, further comprising:
a sub-display disposed in at least a partial area of a rear surface of the electronic device.

14. The electronic device of claim 13, further comprising:
at least one processor operationally connected with the flexible display, the sub-display, the first antenna group, the second antenna group, and the third antenna group,
wherein the at least one processor is configured to:
recognize whether voltage is applied to the sub-display, and
activate the third antenna group and inactivate the first antenna group, based on the recognition of the voltage being applied to the sub-display.

15. The electronic device of claim 11, wherein the fifth conductive member and the sixth conductive member are spaced apart from the first side member and the second side member.

16. The electronic device of claim 11, wherein the fifth conductive member and the sixth conductive member have different lengths.

17. The electronic device of claim 11,
wherein the hinge structure further includes a third nonconductive member disposed between the fifth conductive member and the sixth conductive member, the third nonconductive member forming a third part of the hinge structure, and
wherein the hinge structure includes a spacing space overlapping the first part, the second part, and the third part in the hinge structure.

18. The electronic device of claim 11,
wherein the hinge structure further includes a third nonconductive member disposed between the fifth conductive member and the sixth conductive member,
wherein the third nonconductive member forms a third part of the hinge structure,
wherein the first part, the second part, and the third part of the hinge structure form at least a portion of an area through which the hinge structure is shown to the outside,
wherein the hinge structure includes a spacing section overlapping the first part and the second part in the hinge structure, and
wherein the spacing section is made of a nonconductive material.

19. The electronic device of claim 11,
wherein the hinge structure includes a third part disposed between the first part and the second part,
wherein the hinge structure includes a hinge cover shown to the outside, and the first part, the second part, and
wherein the third part of the hinge structure forms the hinge cover.

20. The electronic device of claim 11, further comprising:
a grip sensor; and
at least one processor operationally connected with the grip sensor, the first antenna group, the second antenna group, and the third antenna group,
wherein the at least one processor is configured to:
recognize whether a body of a user of the electronic device comes in contact with at least a portion of the first side member and at least a portion of the second side member using the grip sensor, and
activate the third antenna group, based on the recognition.

* * * * *